United States Patent
Chan et al.

(10) Patent No.: US 6,681,073 B2
(45) Date of Patent: Jan. 20, 2004

(54) FIBER OPTIC POWER CONTROL SYSTEMS AND METHODS

(75) Inventors: Kwok Pong Chan, Troy, NY (US); Robert Filkins, Niskayuna, NY (US); David Gilles Gascoyne, Schenectady, NY (US); Richard Alan Hogle, Schenectady, NY (US); Kevin J. Shaughnessy, Clifton Park, NY (US); Robert Christian Tatar, Saratoga Springs, NY (US)

(73) Assignee: Molecular OptoElectronics Corporation, Watervliet, NY (US)

( * ) Notice: Subject to any disclaimer, the term of this patent is extended or adjusted under 35 U.S.C. 154(b) by 402 days.

(21) Appl. No.: 09/812,097

(22) Filed: Mar. 19, 2001

(65) Prior Publication Data

US 2002/0131757 A1 Sep. 19, 2002

(51) Int. Cl.$^7$ ................................................. G02B 6/00
(52) U.S. Cl. .................... 385/140; 385/123; 385/27; 385/31; 385/38
(58) Field of Search ................ 385/27, 30, 31, 385/38, 42, 140, 123

(56) References Cited

U.S. PATENT DOCUMENTS

| | | | |
|---|---|---|---|
| 4,060,308 A | 11/1977 | Barnoski et al. | 385/31 X |
| 4,201,446 A | 5/1980 | Geddes et al. | 385/31 X |
| 4,343,532 A | 8/1982 | Palmer | 385/31 X |
| 4,387,954 A | 6/1983 | Beasley | 385/31 X |
| 4,469,544 A | 9/1984 | Goodman | 156/345 |
| 4,469,554 A | 9/1984 | Turner | 156/657 |
| 4,630,884 A | 12/1986 | Jubinski | 350/96.15 |
| 4,630,890 A | 12/1986 | Ashkin et al. | 350/96.3 |
| 4,704,151 A | 11/1987 | Keck | 65/4.1 |
| 4,712,866 A | 12/1987 | Dyott | 350/96.3 |
| 4,753,497 A | 6/1988 | Fujii et al. | 350/96.15 |
| 4,773,924 A | 9/1988 | Berkey | 65/3.11 |
| 4,778,237 A | 10/1988 | Sorin et al. | 350/96.15 |

(List continued on next page.)

FOREIGN PATENT DOCUMENTS

| | | | |
|---|---|---|---|
| DE | 4005557 A1 | 8/1991 | 385/147 X |
| DE | 4343943 A1 | 6/1995 | 385/147 X |
| EP | 0229456 A2 | 7/1987 | 385/147 X |
| EP | 0488266 A2 | 6/1992 | 385/147 X |
| EP | 0686867 A1 | 12/1995 | 385/140 |
| EP | 1035680 A2 | 9/2000 | 385/147 X |

(List continued on next page.)

OTHER PUBLICATIONS

Bergh, R. A. et al., "Single–Mode Fibre Optic Directional Coupler," *Electron. Lett.* 16 (7), 260–261 (Mar. 1980).
Birks, T.A. and Li, Y.W., "The Shape of Fiber Tapers," *IEEE J. Lightwave Techn.* 10 (4), 432–438 (Apr. 1992).
Brophy, T.J. et al., "Formation and Measurement of Tapers in Optical Fibers," *Rev. Sci. Instrum.* 64 (9), 2650–2654 (Sep. 1993).

(List continued on next page.)

*Primary Examiner*—Brian Healy
(74) *Attorney, Agent, or Firm*—Kevin P. Radigan, Esq.; Heslin Rothenberg Farley & Mesiti P.C.

(57) ABSTRACT

Control systems and methods are provided for controlling optical energy transmitted through a fiber optic. The systems and methods employ a digital controller circuit coupled to at least one sensor for receiving a sensed level stimulus output therefrom, and coupled to a fiber optic power control device for providing a digitized feedback signal thereto. The digital controller circuit, which can operate in one of a plurality of modes and automatically switch between modes, can include one or more of a digital filter, memory for storing control programs and data, an analog-to-digital converter for converting received sensed level stimulus to a digital signal, a digital communication interface, and a processor for software processing of the digital signal. Automatically powering up or resetting the digital power control system is also provided.

62 Claims, 12 Drawing Sheets

U.S. PATENT DOCUMENTS

| | | | |
|---|---|---|---|
| 4,786,130 A | 11/1988 | Georgiou et al. | 350/96.15 |
| 5,060,307 A | 10/1991 | El-Sherif | 359/173 |
| 5,067,788 A | 11/1991 | Jannson et al. | 385/2 |
| 5,078,465 A | 1/1992 | Dahlgren | 385/50 |
| 5,091,984 A | 2/1992 | Kobayashi et al. | 385/16 |
| 5,106,394 A | 4/1992 | Bramson | 51/309 |
| 5,108,200 A | 4/1992 | Nonaka et al. | 385/16 |
| 5,135,555 A | 8/1992 | Coyle, Jr. et al. | 65/12 |
| 5,136,818 A | 8/1992 | Bramson | 51/165.72 |
| 5,265,178 A | 11/1993 | Braun et al. | 385/24 |
| 5,290,398 A | 3/1994 | Feldman et al. | 156/651 |
| 5,351,319 A | 9/1994 | Ginder et al. | 385/6 |
| 5,493,629 A | 2/1996 | Stange | 385/125 |
| 5,623,567 A | 4/1997 | Barberio et al. | 385/30 |
| 5,673,351 A | 9/1997 | Clarke et al. | 385/100 |
| 5,781,675 A | 7/1998 | Tseng et al. | 385/30 |
| 5,853,969 A | 12/1998 | Harada et al. | 430/510 |
| 5,953,690 A | 9/1999 | Lemon et al. | 702/191 |
| 5,966,493 A | 10/1999 | Wagoner et al. | 385/140 |
| 6,011,881 A | 1/2000 | Moslehi et al. | 385/10 |
| 6,031,660 A | 2/2000 | Park et al. | 359/341 |
| 6,191,224 B1 | 2/2001 | Chan et al. | 525/195 |
| 6,205,280 B1 | 3/2001 | Wagoner et al. | 385/140 |
| 6,208,798 B1 | 3/2001 | Morozov et al. | 385/140 |
| 6,323,978 B1 * | 11/2001 | Harley et al. | 359/154 |
| 6,377,396 B1 * | 4/2002 | Sun et al. | 359/341.42 |
| 6,411,429 B1 * | 6/2002 | Tomofuji et al. | 359/337 |
| 6,434,318 B1 * | 8/2002 | Bischel et al. | 385/140 |
| 6,483,981 B1 * | 11/2002 | Krahn et al. | 385/140 |

FOREIGN PATENT DOCUMENTS

| | | | |
|---|---|---|---|
| EP | 1037090 A2 | 9/2000 | 385/147 X |
| EP | 1065821 A2 | 1/2001 | 385/147 X |
| GB | 2190211 A | 11/1987 | 385/31 X |
| GB | 2184859 A | 7/1997 | 385/31 X |
| GB | 2351625 A | 1/2001 | 385/31 X |
| JP | 60-203904 | 10/1985 | 385/147 X |
| JP | 06-114713 | 4/1994 | 385/31 X |
| WO | WO 87/03676 | 6/1987 | 385/147 X |
| WO | WO 89/01171 | 2/1989 | 385/147 X |
| WO | WO 95/05617 | 2/1995 | 385/147 X |
| WO | WO 00/18019 | 3/2000 | 385/140 X |
| WO | WO 00/49434 | 8/2000 | 385/147 X |
| WO | WO 00/49438 | 8/2000 | 385/147 X |
| WO | WO 00/49439 | 8/2000 | 385/147 X |

OTHER PUBLICATIONS

Carrara, S. L. A. et al., "Elasto–Optic Alignment of Birefringent Axes in Polarization–Holding Optical Fiber," *Opt. Lett.* 11 (7), 470–472 (Jul. 1986).

Cordaro, M. H. et al., "Precision Fabrication of D–Shaped Single–Mode Optical Fibers by In Situ Monitoring," *IEEE J. Lightwave Techn.*, 12, (9) 1524–1531 (Sep. 1994).

Diez A. et al., "Cynlindrical Metal–Coated Optical Fibre Devices for Filters and Sensors," *Electron. Lett.*. 32 (15), 1390–1392 (Jul. 1996).

Digonnet, M. J. F., et al., "Measurement of the Core Proximity in Polished Substrates and Couplers," *Opt. Lett.* 10 (9), 463–465 (Sep. 1985).

Fink, Donald G. and Christiansen, Donald, *Electronic Engineers' Handbook*, Third Edition, Ch. 24, 14–18 (1989).

Gowar, J., *Optical Communication Systems*, Ch.3, 58–77 (2d Ed. 1993).

Hussey, C.D. and Minelly, J.D., "Optical Fibre Polishing with a Motor–Driven Polishing Wheel," *Electron. Lett.* 24, 805–807 (Jun. 1988).

Kenny, R.P. et al., "Control of Optical Fibre Taper Shape," *Electron. Lett.* 27 (18), 1654–1656 (Aug. 1991).

Love, J.D. and Henry, W.M. "Quantifying Loss Minimisation in Single–Mode Fibre Tapers," *Electron. Lett.* 22 (17), 912–914 (Aug. 1986).

McCallion, K. J. and Shimazu, M., "Side–Polished Fiber Provides Functionality and Transparency," *Optoelectronics World*, S19, S20, S22 and S24 (Sep. 1998).

Morozov V. et al., "Fused Fiber Optic Variable Attenuator," *OFC 2000, 25th Annual Optical Fiber Communications Conference*, 22–24 (Mar. 10, 2000).

Mueller–Westerhoff, U.T. et al., "The Synthesis of Dithiolene Dyes with Strong Near–IR Absorption," *Tetrahedron* 47, 909–932 (1991).

Leminger, O.G. and R. Zengerle, "Determination of Single–Mode Fiber Coupler Design Parameters from Loss Measurements," *IEEE J. Lightwave Tech..*, (4), 864–867 (Aug. 1985).

Pan, Ru–Pin et al., "Voltage–Controlled Optical Fiber Coupler Using a Layer of a Low–Refractive–Index Liquid Crystal with Positive Dielectric Anisotrophy," *Jpn. J. Appl. Phys.* 34, Part 1, No. 12A, 6410–6415 (Dec. 1995).

Parriaux, O. et al., "Distributed Coupling on Polished Single–Mode Optical Fibers," *Appl. Opt.* 20, 2420–2423 (Jul. 1981).

Todd, D.A. et al., "Polarization–Splitting Polished Fibre Optic Couplers," *Optical Engineering* 32 (9), 2077–2082 (Sep. 1993).

Marlow Industries, Inc., "Design Guide—Power Supplies" and "Frequently Asked Questions" www.marlow.com.

Technological Arts, Adapt912 Technical Specification Sheet (1999).

Johnstone, W. et al., "Fibre Optic Modulators Using Active Multimode Waveguide Overlays" *Electronics Letters*, vol. 27, No. 11, pp. 894–896 (May 23, 1991).

Johnstone, W. et al., "Fiber–Optic Fefractometer that Utilizes Multimode Waveguide Overlay Devices," *Optics Letters*, vol. 17, No. 21, pp. 1538–1540 (Nov. 1, 1992).

McCallion, K. et al., "Investigation of Optical Fibre Switch Using Electro–Optic Interlays" *Electronic Letters*, vol. 28, No. 4, pp. 410–411 (Feb. 13, 1992).

Zhang, M. et al., "Single–mode fiber–film directional coupler" *Journal of Lightwave Technology*, Vol LT–5, No. 2, pp. 260–264 (Feb. 1987).

* cited by examiner

FIBER OPTIC POWER CONTROL SYSTEMS AND METHODS

CROSS-REFERENCE TO RELATED APPLICATIONS

This Application is related to the following commonly assigned U.S. patent applications:

Ser. No. 09/628,887, filed Jul. 31, 2000, entitled "DYE-APPENDED DISPERSION-CONTROLLED POLYMERS FOR BROADBAND FIBER OPTIC DEVICES", now U.S. Pat. No. 6,489,399, issued Dec. 3, 2002;

Ser. No. 09/605,110, filed Jun. 28, 2000, entitled "SINGLE CHANNEL ATTENUATORS", now U.S. Pat. No. 6,483,981, issued Nov. 19, 2002;

Ser. No. 09/539,469, filed Mar. 30, 2000, entitled "CONTROLLABLE FIBER OPTIC ATTENUATORS EMPLOYING TAPERED AND/OR ETCHED FIBER SECTIONS", now U.S. Pat. No. 6,466,729, issued Oct. 15, 2002;

Serial No. 09/139,457, filed Aug. 25, 1998, entitled "DISPERSION CONTROLLED POLYMERS FOR BROADBAND FIBER OPTIC DEVICES", now U.S. Pat. No. 6,191,224, issued Feb. 20, 2001;

Ser. No. 09/139,832, filed Aug. 25, 1998, entitled "BLOCKLESS TECHNIQUES FOR SIMULTANEOUS POLISHING OF MULTIPLE FIBER OPTICS", now U.S. Pat. No. 6,374,011, issued Apr. 16, 2002;

Ser. No. 09/139,787, filed Aug. 25, 1998, entitled "BLOCKLESS FIBER OPTIC ATTENUATORS AND ATTENUATION SYSTEMS EMPLOYING DISPERSION CONTROLLED POLYMERS", now U.S. Pat. No. 6,205,280, issued Mar. 20, 2001;

Ser. No. 09/026,755, filed Feb. 20, 1998, and entitled "FIBER OPTIC ATTENUATORS AND ATTENUATION SYSTEMS," now U.S. Pat. No. 5,966,493, issued Oct. 12, 1999; and Ser. No. 09/811,913, filed on Mar. 19, 2001 herewith, and entitled "VARIABLE OPTICAL ATTENUATOR EMPLOYING POLARIZATION MAINTAINING FIBER", now pending.

Each of these Applications is hereby incorporated by reference herein in its entirety.

TECHNICAL FIELD

The present invention relates to fiber optic power control devices and systems for controlling optical energy transmitted through a fiber optic. As one example, a fiber optic power control device in accordance with the present invention may comprise a controllable attenuator and attenuation system for attenuating optical energy transmitted through the fiber optic.

BACKGROUND OF THE INVENTION

Fiber optic systems often require precise control of optical signal levels entering various system components. This is particularly true for systems at test and characterization stages of deployment. A controllable optical attenuator can be used, for example, to characterize and optimize the optoelectronic response of high-speed photoreceivers, wherein the detection responsivity is dependent on the average optical power incident on the photodiode.

The majority of controllable fiber optic attenuators currently commercially available rely on thin-film absorption filters, which require breaking the fiber and placing the filters in-line. Controllable attenuation is then achieved mechanically by, for example, rotating or sliding the filter to change the optical path length within the absorptive material. This adversely impacts the response speed of the device, the overall mechanical stability, zero attenuation insertion loss and optical back reflection. In general, broken fiber designs suffer numerous disadvantages such as high insertion loss, significant back reflection, and large size. These factors can be minimized, although such corrective measures typically result in added cost and/or size.

Additional issues have impeded the development of thermo-optic variable attenuators, including: (i) the thermal mass of surrounding materials and/or structures which significantly degrade device response time; and (ii) spectrally non-uniform attenuation, resulting from a dispersion mismatch between the optical mode index of the underlying transmission media and a controllable overlay material.

As described in many of the above-noted, commonly assigned, United States patent applications, techniques have been proposed to overcome these weaknesses by providing a "blockless" attenuator implementation. The "blockless" technique of suspending a portion of a fiber optic within a dispersion-controlled, controllable material, addresses the thermal mass responsivity and spectral uniformity problems. The portion of the fiber optic is modified to allow extraction of optical energy therefrom by the controllable material.

Now, enhanced control systems and methods for such an attenuator device, or other fiber optic power control device, are desirable to improve operability, predictability and marketability of the device. The present invention is direction to providing such enhanced control systems and methods.

SUMMARY OF THE INVENTION

The shortcomings of the prior approaches are overcome, and additional advantages are provided, by the present invention, which in one aspect relates to an attenuation system for attenuating optical energy transmitted through a fiber optic. The attenuation system includes a controllable attenuator and a control circuit coupled to the controllable attenuator. The attenuator is arranged with respect to a portion of the fiber optic, which has a side surface through which at least some of the optical energy can be controllably extracted. A controllable material is formed over the side surface for controlling an amount of optical energy extracted from the fiber optic according to a changeable stimulus applied to the controllable material, which affects the index of a refraction thereof. The control circuit controls a value of the changeable stimulus applied to the controllable material in accordance with a digitized feedback signal having a value related to the level of at least a portion of the optical energy transmitted within the fiber optic. The control circuit includes a digital filter for filtering an error signal produced by the control circuit. The error signal is produced by comparing the feedback signal to a desired reference level.

In another aspect, the present invention relates to a control system for controlling optical energy transmitted through a fiber optic. The control system includes a fiber optic power control device, arranged with respect to a portion of the fiber optic, and at least one sensor coupled to the fiber optic or the power control device for sensing the level of at least a portion of the optical energy transmitted within the fiber optic, and for outputting based thereon, a sensed level stimulus. A controller circuit is also provided and coupled to the at least one sensor for receiving the sensed level stimulus output therefrom, and coupled to the fiber optic power control device for providing a digitized feedback signal thereto. The digitized feedback signal has a value related to the sensed level stimulus. The controller circuit includes: memory for holding at least one of a control program, a control setting or a control mode to be used by the controller circuit; an analog-to-digital converter for receiving the sensed level stimulus and for converting the sensed level stimulus to a digital signal for processing within the controller circuit; a digital communication interface for facilitating monitoring of one or more of the fiber optic, the fiber optic power control device or the controller circuit, and/or for facilitating inputting or adjusting of control parameters employed by the controller circuit; and a processor for software processing of the digital signal output by the analog-to-digital converter in accordance with at least one of the control program, the control parameters or the control mode.

In still another aspect, the present invention discloses a method of controlling optical energy transmitted through a fiber optic. The method includes: disposing a fiber optic power control device with respect to a portion of the fiber optic so as to control the power transmitted therethrough, wherein the fiber optic power control device operates in accordance with one of multiple control modes; and controlling the fiber optic power control device, the controlling including automatically switching control of the fiber optic power control device from a first control mode to a second control mode of the multiple control modes, the automatic switching being responsive to detection of a defined condition of the fiber optic, the optical energy transmitted therethrough, or with the fiber optic power control device.

In a further aspect, the present invention provides a method for powering up or resetting a digital power control system which controls optical energy transmitted through a fiber optic. The method includes providing non-volatile memory for storing mode and setpoint data employed by the digital power control system; and responsive to powering up or resetting of the digital power control system, automatically reading the mode and setpoint data from the non-volatile memory and using the mode and setpoint data to initiate a control algorithm within the digital power control system for controlling optical energy transmitted through the fiber optic.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENTS

The present invention is directed to improved control systems for optical devices, and in particular to a digital feedback/control system, and associated hardware and software, for sensing signal levels and providing resultant control signals to the fiber optic device.

Figure 1:
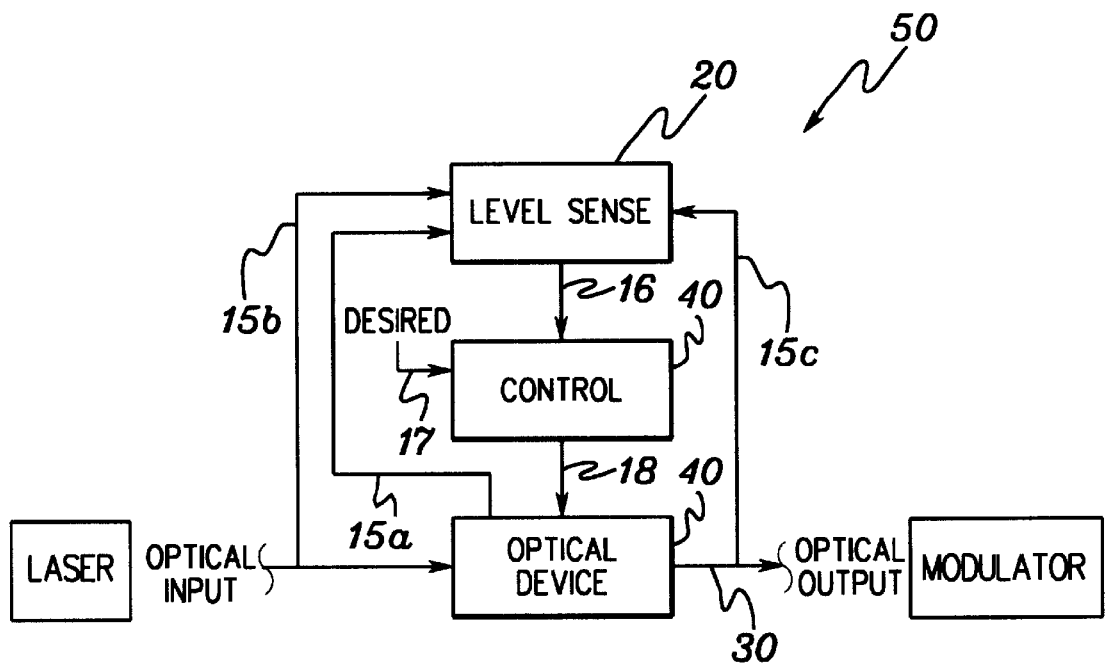
FIG. 1 is an exemplary control system within which an optical device can be employed and controlled.

FIG. 1 depicts an exemplary system 50 employing a fiber optic device 10 placed in a fiber optic path 30. The system implements a closed-loop feedback system to maintain the state of the optical device. Variants of this system are disclosed in detail in the above-incorporated U.S. patent applications, in connection with variable fiber optic attenuators (discussed further below). Sense leads 15a–c operated by a sense unit 20 can sense a parameter in the device itself (15a) related to the optical signal level transmitted in the fiber (e.g., temperature of a thermo-optically controlled material), and/or can sense optical signal levels (15b–c) directly from the input and/or output portions of the fiber using optical taps. The optical signal level can be indirectly measured from electrical levels recovered (i.e., demodulated) from the optical signal. The fiber sense leads 15b–c can either be implemented as shown outside of the device, or inside the device using optical tap(s). For a measure of optical attenuation (i.e., the difference between the input and output optical levels), two taps are used. For a measure of only absolute, output power, only one tap is required on the output fiber portion.

The level sense unit 20 thus can provide a level stimulus or feedback signal 16 having a value related to the optical energy transmitted in the fiber optic 30, which can be used to control the characteristics of optical device in this feedback circuit. For example, a control circuit 40 can receive the feedback signal 16, a desired level stimulus 17, and by comparing the two produce a control stimulus 18 for controlling device 10.

Figure 2:
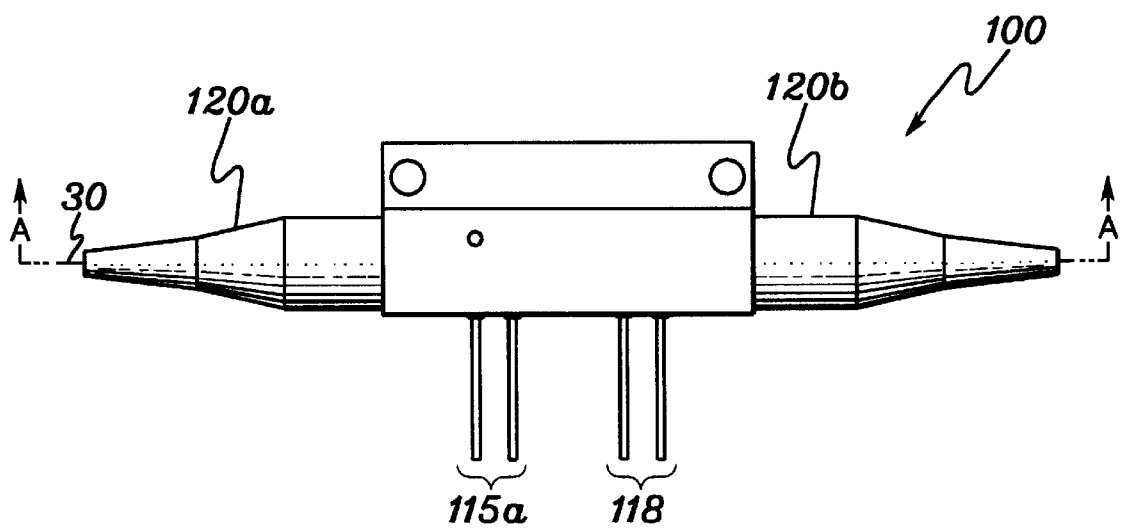
FIG. 2 is a top plan view of an exemplary optical device, in the form of a controllable or variable optical attenuator (VOA)
Figure 3:
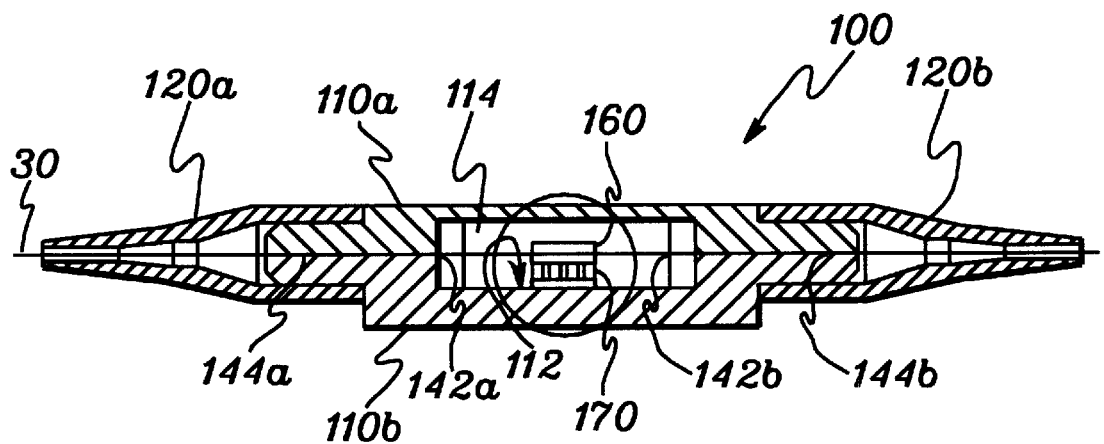
FIG. 3 is a central, cross-sectional view of the attenuator of FIG. 2.
Figure 4:
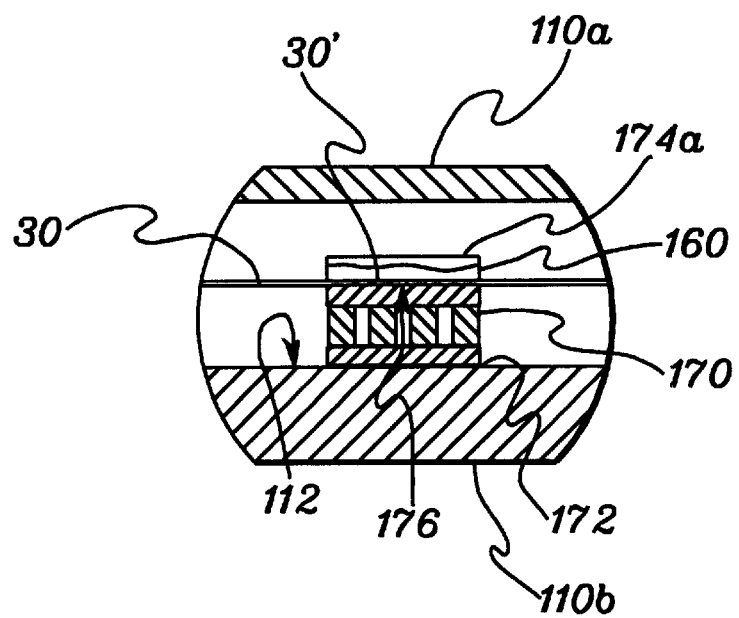
FIG. 4 is an enlarged view of certain internal features of the attenuator of FIGS. 2–3.

With reference to FIGS. 2–4, an exemplary fiber optic device in the form of variable optical attenuator ("VOA") 100 is shown, for attenuating optical energy transmitted in fiber optic 30. Attenuator 100 includes a housing comprising complementary shell pieces 110a and 110b, and strain reliefs 120a and 120b. Control leads 115a and 118 may also be provided for attenuator sense and control respectively, as discussed above with reference to the system of FIG. 1.

The attenuator is formed with respect to a portion of the fiber optic 30 having a side surface through which optical energy can be controllably extracted (e.g., polished, tapered and/or etched as discussed in the above-incorporated U.S. applications). By maintaining the integrity of the fiber optic within this attenuator, unnecessary losses due to interruption of the fiber can be controlled. In one exemplary embodiment, the entire housing, including the strain reliefs, is 2.6 inches in length, and about 0.5 inches in width. Therefore, the attenuator of the present invention can be implemented in a relatively small package suitable for many types of system and/or field uses.

With particular reference to the central cross-sectional view of FIG. 3, a housing comprising, in one example, complementary shell pieces 110a and 110b is provided to accommodate the input and output sections of the fiber, as well as additional, internal components. When assembled, the shell pieces form a thermally insulative cavity 114 filled with air or other effective thermal insulator, with two support points 142a and 142b between which the fiber is suspended These support points in this example are at the ends of longitudinal notches 144a and 144b formed in one or both shell pieces to accommodate the input and output portions of the fiber.

In accordance with the previously filed U.S. applications discussed above, a bulk, controllable material, here designated 160, is formed over a surface of the fiber to controllably remove optical energy from a side surface of the fiber. Electro-optic or thermo-optic materials, for example, are appropriate for this purpose, having refractive indices, and resultant attenuation effects, which vary according to applied electrical or thermal stimuli, respectively. Shown in FIGS. 3–4 is an exemplary thermo-optic material 160 surrounding the suspended portion of fiber optic 30', and with an underlying controllable heating/cooling (heating and/or cooling) source 170 which is mounted, via for example a thermally conductive epoxy or solder 172, to an inside wall 112 of shell piece 110b, in cavity 114.

The suspension of the portion 30' of the fiber within only material 160, but without any other significant thermal contacts, results in an efficient, thermally insulated attenuation device such that any changes in temperature induced by the controllable heating/cooling source 170 are transferred solely, and quickly, to the thermo-optic material 160, but to no other surrounding structures. Since the fiber is suspended in a thermally insulative environment in cavity 114 (e.g., air or any other effective thermal insulator), and is in thermal contact with only material 160 and possibly with the surface of source 170, the heat sink effect of surrounding structures is minimized, and faster and more predictable control of the temperature, and therefore the optical attenuating effects, are provided.

With further reference to the enlarged view of FIG. 4, as discussed above, controllable heating/cooling source 170 is mounted to an inside housing wall 112, using epoxy or solder 172, and projects toward fiber optic portion 30'. Source 170 supports a controllable material 160 on its active control surface 176, possibly within a channel, a portion of which (174a) is shown. As discussed in greater detail below, a portion 30' of fiber optic 30 has a side surface along which the evanescent field of the optical energy transmitted therein is exposed, such that at least some of the optical energy can be controllably extracted therefrom, using controllable material 160.

Figure 5:
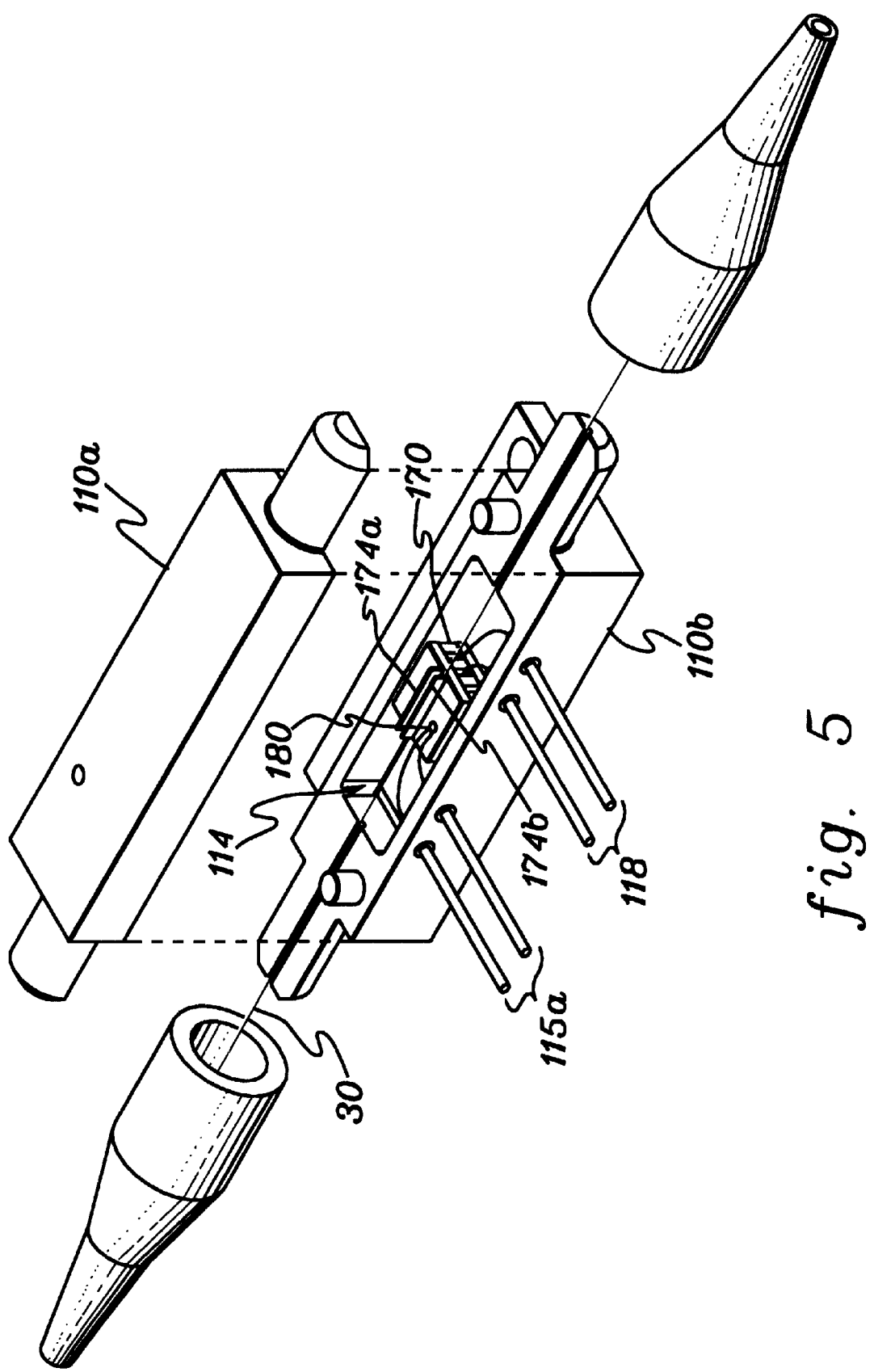
FIG. 5 is an exploded, isometric view of the attenuator of FIGS. 2–3.

With reference to the exploded view of FIG. 5, L-brackets 174a and 174b are shown as part of, or affixed to, the heating/cooling source 170, controlled by connected leads 118. A channel may be formed by the L-brackets, in which the fiber is placed, and in which the controllable material (not shown here) can be deposited over the fiber. As discussed above, this entire assembly is substantially thermally insulated in the housing cavity 114. A sense device, e.g., temperature sensor or thermistor 180, can be placed on this assembly to sense a parameter (e.g., temperature) of the channel, source 170, and controllable material 160, which is known via calibration or otherwise to be related to the level of optical energy transmitted in the fiber optic. The signal(s) representing the temperature can be carried from the attenuator using sense leads 115a, and the control signals(s) to the controllable source carried to the attenuator using control leads 118.

Improvement in the spectral uniformity of the attenuator can be obtained through proper choice of controllable material 160. Suitable controllable materials are disclosed in commonly assigned U.S. Pat. No. 6,191,224, and copending applications U.S. Ser. Nos. 09/628,887 and 09/605,110, which, as indicated above, are incorporated herein by reference. Procedures for preparing the compositions and/or commercial sources for obtaining the materials used in the compositions are fully described in the incorporated disclosures.

U.S. Pat. No. 6,191,224 discloses dispersion-controlled, refractive-index controlled polymer compositions, which are useful as controllable materials 160 in the broad wavelength region extending from about 1500 nm to about 1600 nm. The disclosed polymer compositions each comprise a polymer and an infraredabsorbing dye, which are generally in admixture. Typically, the polymer is a polar olefin polymer, which comprises monomeric units derived from two or more polar olefins. Usually the polar olefins, also known as "polyolefins", are acrylates, and/or they may be selected from, but are not limited to: tetrafluoropropyl acrylate, tetrafluoropropylmethacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

The term "polar" typically refers to, e.g., the property in which the positive and negative electrical charges of the olefin monomers are permanently separated, and the term "olefin" refers to, e.g., the class of unsaturated aliphatic hydrocarbons having one or more double bonds.

Suitable infrared absorbing dyes for use in the composition include, for example, (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate, or a metal complex dye having the general formula bis[1,2-[(4-alkyl$^1$alkyl$^2$amino)phenyl]-1,2-ethylenedithiolate]Met represented by structure (I)

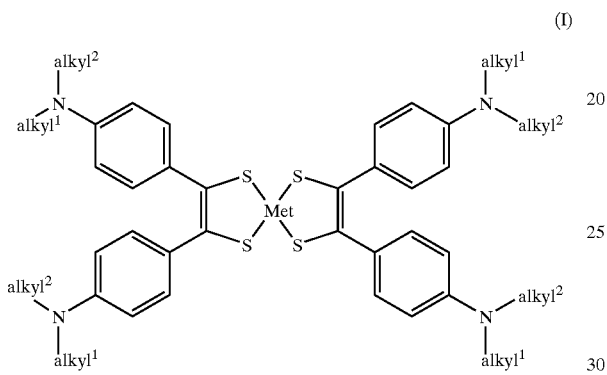

(I)

In Structure (I), alkyl$^1$ and alkyl$^2$ are each independently lower alkyls containing 2 to 8 carbon atoms. In addition, alkyl$^1$ may differ from or may be the same as alkyl$^2$. Met is a Group IIIB metal, such as nickel, palladium or platinum. Exemplary metal complex dyes include bis[1,2-(4-dibutylaminophenyl)-1,2-ethylenedithiolate]nickel; bis[1,2-[4-(ethyl heptyl amino)phenyl]-1,2-ethylenedithiolate] nickel; bis[1,2-(4-dibutylaminophenyl)-1,2-ethylenedithiolate]platinum; or bis[1,2-[4-(ethyl heptyl amino)phenyl]-1,2-ethylenedithiolate]platinum.

Alternatively, for use in broadband devices, controllable material 160 may be a dye-appended polymer composition disclosed in copending, commonly assigned U.S. Ser. No. 09/628,887. These dye-appended polymer compositions include an infrared absorbing dye component and a copolymer component, which comprises at least one appended polar olefin copolymer chemically bonded to the dye component through a linking moiety attached to one chain end of the copolymer. Each appended polar olefin copolymer includes monomeric units derived from two or more polar olefins having an ester, benzene or halogen substituent attached thereto. Optionally, the copolymer component may also include a detached polar olefin copolymer mixed with the dye-appended polymer. In the detached copolymer, the monomeric units are also derived from two or more polar olefins having an ester, benzene or halogen substituent attached thereto. Exemplary polar olefins for use in these compositions include those previously listed herein.

Illustrative examples of dye moieties include, but are not limited to, dithiolate metal-based complex dyes having structures (II)–(VI)

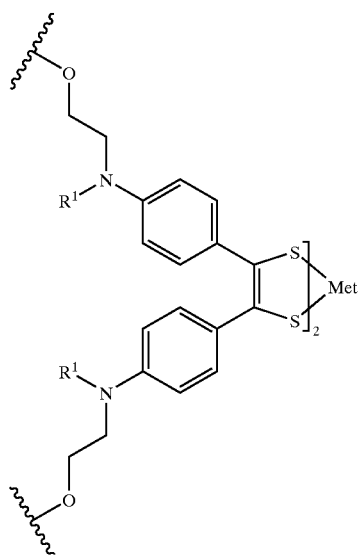

(II)

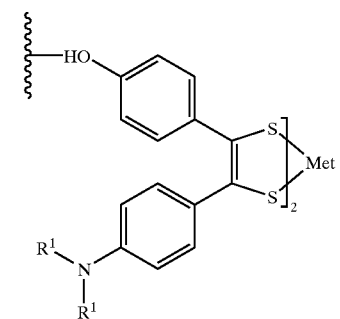

(III)

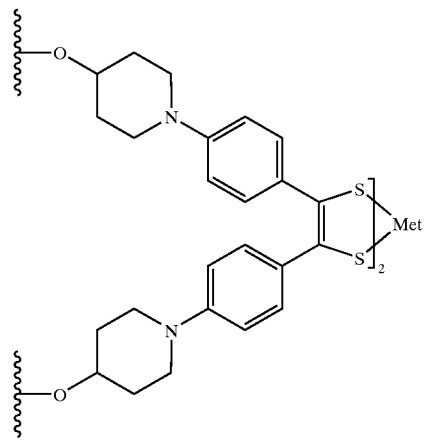

(IV)

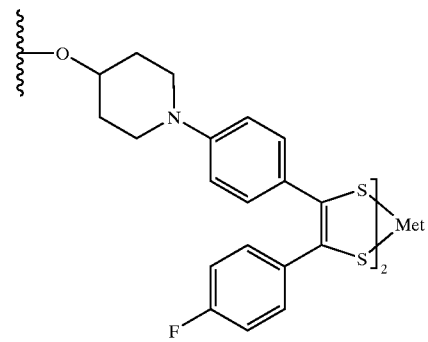

(V)

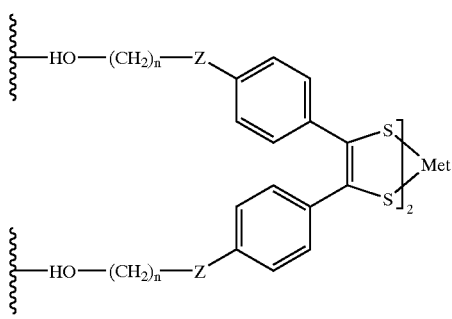

(VI)

In structures (II)–(VI), each wavy line indicates a point of attachment from the dye to a linking group at the end of a polar olefin copolymer component, thereby appending the dye to the copolymer. Each $R^1$ is independently a "lower alkyl", which refers to, e.g., saturated hydrocarbon residues containing one to twelve carbons in straight or branched chains, as well as cyclic structures when possible. "Met" is as previously defined. In structure (VI), Z may be oxygen (O) or sulfur (S), and n is 2 to 12.

When controllable material 160 is one of the aforementioned dye-doped or dye-appended polymer compositions, a uniform spectral response across a broad wavelength region, e.g., 1500–1600 nm, can be obtained. However, when attenuation of light within a single channel is desired, a dye-free polymer composition, such as disclosed in commonly assigned, copending U.S. Ser. No. 09/605,110, is suitable for controllable material 160. In this embodiment, controllable material 160 is a crosslinked siloxane polymer composition preferably formed by crosslinking an uncrosslinked vinyl-terminated dimethylsiloxane-diphenylsiloxane copolymer with a silane crosslinking agent in the presence of a platinum catalyst. The optical energy propagating through the fiber can be controllably extracted therefrom at a particular wavelength by adjusting the refractive index of the crosslinked siloxane polymer composition, either thermally or by controlling the composition of the material. Uncrosslinked vinyl-terminated dimethylsiloxane-diphenylsiloxane copolymers are represented by structural formula (VII)

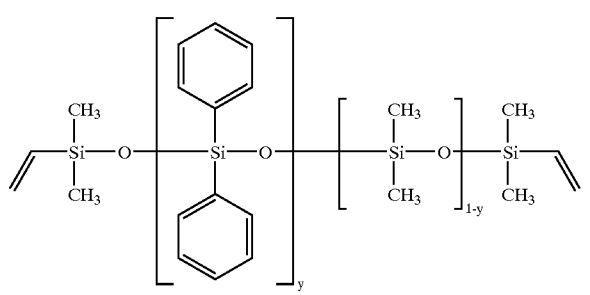

(VII)

wherein the monomer

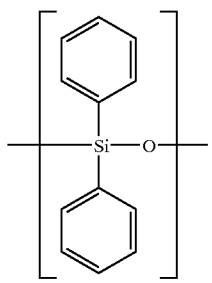

is referred to herein as "Ph$_2$SiO" or "phenyl" unit/monomer. In structure (VII), y is the mole fraction of the Ph$_2$SiO monomer, and 1−y is the mole fraction of the (CH$_3$)$_2$SiO monomer. The refractive index of the crosslinked polysiloxane composition can be controlled by varying the phenyl group content of polymer (VII).

Useful crosslinking agents include, e.g., tetrafunctional and trifunctional silanes. Particular silane crosslinking agents which result in crosslinked materials having excellent optical and thermal properties are, for example, polyphenyl-(dimethylhydrosiloxy)siloxanes and 1,3-diphenyl-1,1,3,3-tetrakis (dimethylsiloxy)disiloxane. Mixtures of the agents can also be used to crosslink vinyl-terminated polymer (VII). Polyphenyl-(dimethylhydrosiloxy)siloxanes may be represented by structure (VIII)

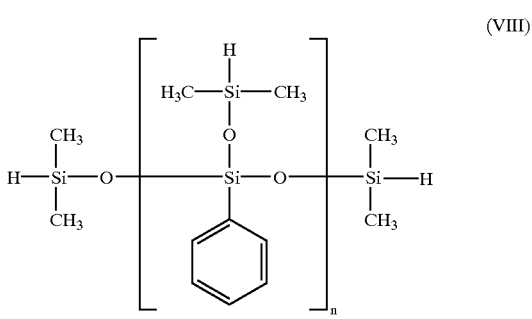

(VIII)

where n is an integer from 1 to 4. 1,3-Diphenyl-1,1,3,3-tetrakis(dimethylsiloxy)disiloxane is given by structure (IX)

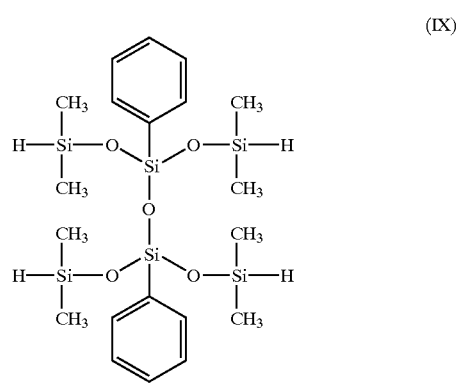

(IX)

An exemplary platinum catalyst is platinum-cyclovinylmethyl-siloxane, and the procedure for carrying out the crosslinking reaction is fully set forth U.S. Pat. Nos. 5,266,352 and 5,217,811. The resulting crosslinked siloxane copolymer (after curing) exhibits good optical properties and good gel-type integrity.

Prior to crosslinking, a catalyst inhibitor may optionally be added to the reaction mixture to extend the pot life at room temperature. One suitable inhibitor, which is commercially available is 1,3,5,7-tetravinyl-1,3,5,7-tetramethyl cyclotetrasiloxane having structural formula (X)

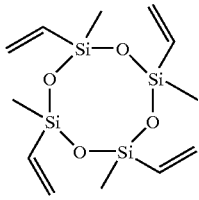

(X)

However, other inhibitors may be used, as will be obvious to those of skill.

As noted briefly above, the present invention is directed in one aspect to improved control systems and methods for optical devices, and in particular to a digital feedback/control system, and associated hardware and software, for sensing signal levels and providing resultant control signals to the fiber optic device. Detailed embodiments of the present invention are described herein below with reference to a variable optical attenuator (VOA) such as described above in connection with FIGS. 1–5.

Figure 6:
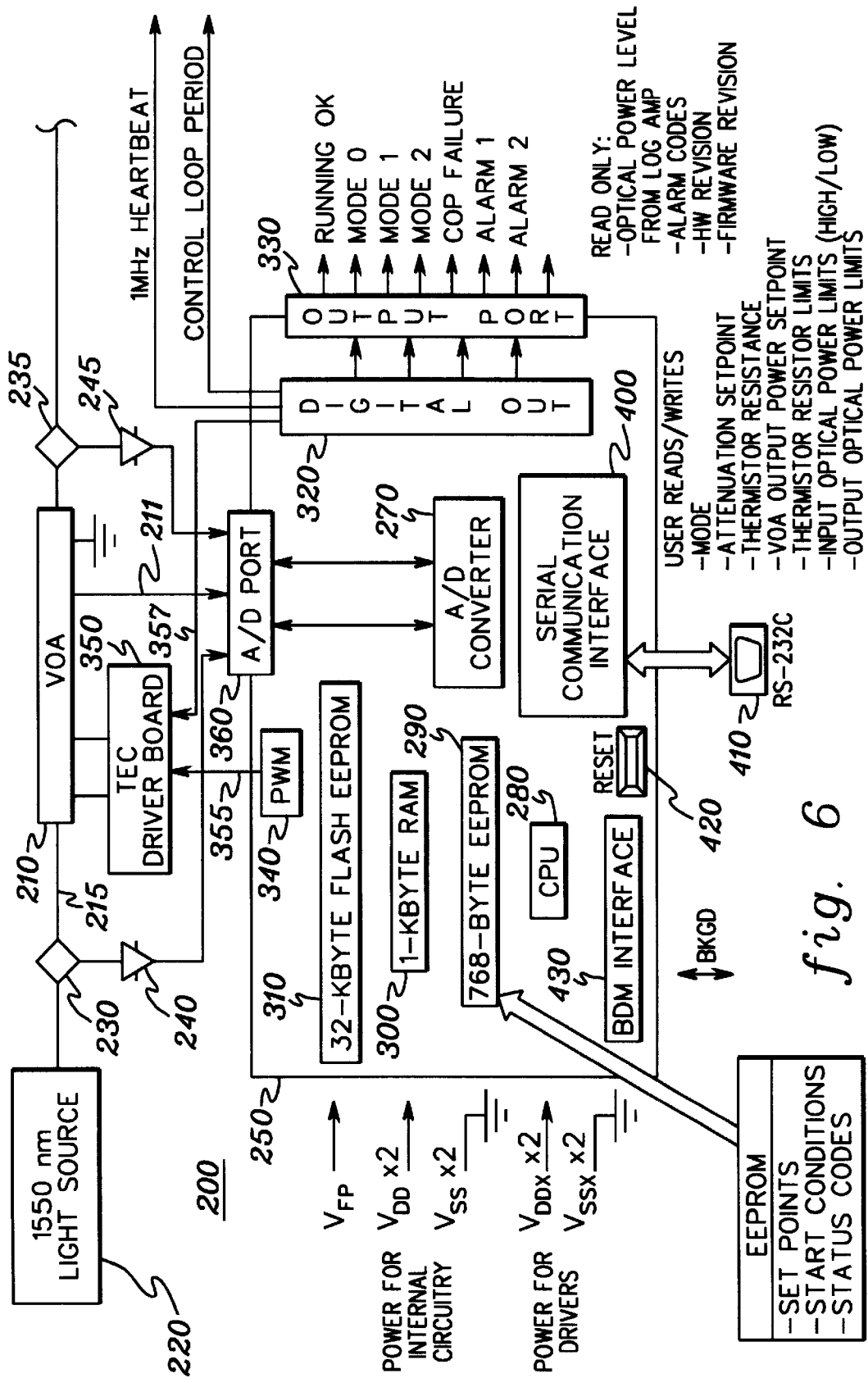
FIG. 6 is one embodiment of a digital control circuit in accordance with the principles of the present invention.

FIG. 6 depicts one embodiment of a control system, generally denoted 200, in accordance with the present invention. System 200 includes a VOA 210 and a digital control circuit 250. VOA 210 is placed in a fiber optic path 215 across which optical signals traverse; for example, signals generated by a light source 220. The attenuation system implements a closed-loop feedback system to maintain the state of the VOA 210. Variants of the system are disclosed in detail in the above-incorporated U.S. patent applications, again in connection with variable fiber optic attenuators.

Optical taps 230 and 235 comprise input and output taps respectively, for sensing a portion of the optical signal level transmitted through the fiber. In addition, or alternatively, a sense unit can be integrated with the VOA 210 to sense a parameter of the device itself related to the optical signal level transmitted in the fiber (e.g., temperature of a thermo-optically controlled material) and provide a feedback signal 211 to digital control circuit 250.

After undergoing log amplification 240, 245, the sensed level signals output by taps 230 & 235 are input to an analog/digital port 260 of digital control circuit 250. These sensed level signals, which in one embodiment are assumed to comprise analog signals, are converted by an analog/digital converter 270 to digital signals for processing by the digital control circuit. In one embodiment, photoreceivers 230, 235 (e.g.,Telcom 13PD75-F) are used with respective logarithmic amplifiers 240, 245 (Analog Devices AD8307). This combination provides an output voltage that is logarithmically proportional to the optical power in the fiber. The log amplifier is internally temperature compensated to provide accurate values over the temperature range of system operation. In accordance with the present invention, this design provides the useful logarithmic measure of the power in an optical fiber, and temperature compensation ensures that the ambient temperature and/or the temperature changes caused by optical power fluctuations, do not impact this measurement. The logarithmic output, with its dB scale, is especially attractive in optical systems (e.g., the control system discussed herein) which are often specified in log scales.

A central processing unit (CPU) or microprocessor 280 executes the control program stored, for example, in a flash EEPROM (such as 32-Kbyte flash EEPROM 310) using configuration information (e.g., setpoints, start conditions and status codes) stored in an EEPROM 290. The random access memory (RAM) 300 comprises working memory for the microprocessor. Thus, a control program is executed by the CPU, runs out of the flash EEPROM 310 and stores variables and non-volatile configuration information in the RAM 300 and EEPROM 290, respectively.

The control program interacts (in this embodiment) with a single pulse width modulation (PWM) channel 340, which sends square wave pulses to TEC driver board 350. By controlling the width and the period of the square wave pulses outputted to the TEC driver board, the desired digital control is achieved. This control is responsive to the analog signals inputted to the A/D port 260. Again, these signals may be representative of one or more of the optical input power, optical output power or a temperature within the VOA.

Digital control circuit 250 further includes a digital output circuit 320. This circuit 320 outputs multiple clock signals for diagnostics, for example, a 1 KHz heart beat signal and a control loop period signal. In addition, a directional signal is output on line 357 to the TEC driver board 350 to control the direction of current flow within the TEC, and thereby control whether the TEC is heating or cooling the controllable material of VOA 210. Digital circuit 320 also provides feedback information on control system performance and mode. For example, through an output port 330 light emitting diodes could be employed to indicate whether the attenuation system is running normally, i.e., has passed any self-testing or whether a chip operating properly (COP) failure has occurred. In addition, multiple alarm signals could be provided, along with an indication of the control mode (e.g., mode 0, mode 1, mode 2) being executed by the digital control system.

A serial communication interface 400 communicates through a standard interface 410, for example, with a system operator or an automated controlling module. Interface 400 allows, for example, a user to read or view optical power levels, alarm codes, or any hardware or firmware revisions. In addition, the user can be allowed to read/write one or more of the mode of the control system, an attenuation setpoint, a thermistor resistance, a VOA output power setpoint, thermistor resistance limits, input optical power limits (high/low) and output optical power limits, etc.

The BDM interface 430 is a diagnostic interface which, for example, could be used by a technician to reprogram the flash EEPROM. BKGD indicates that the interface is a background mode operation. The reset button 420 can be used to reset the microprocessor to a power ON state.

Figure 7:
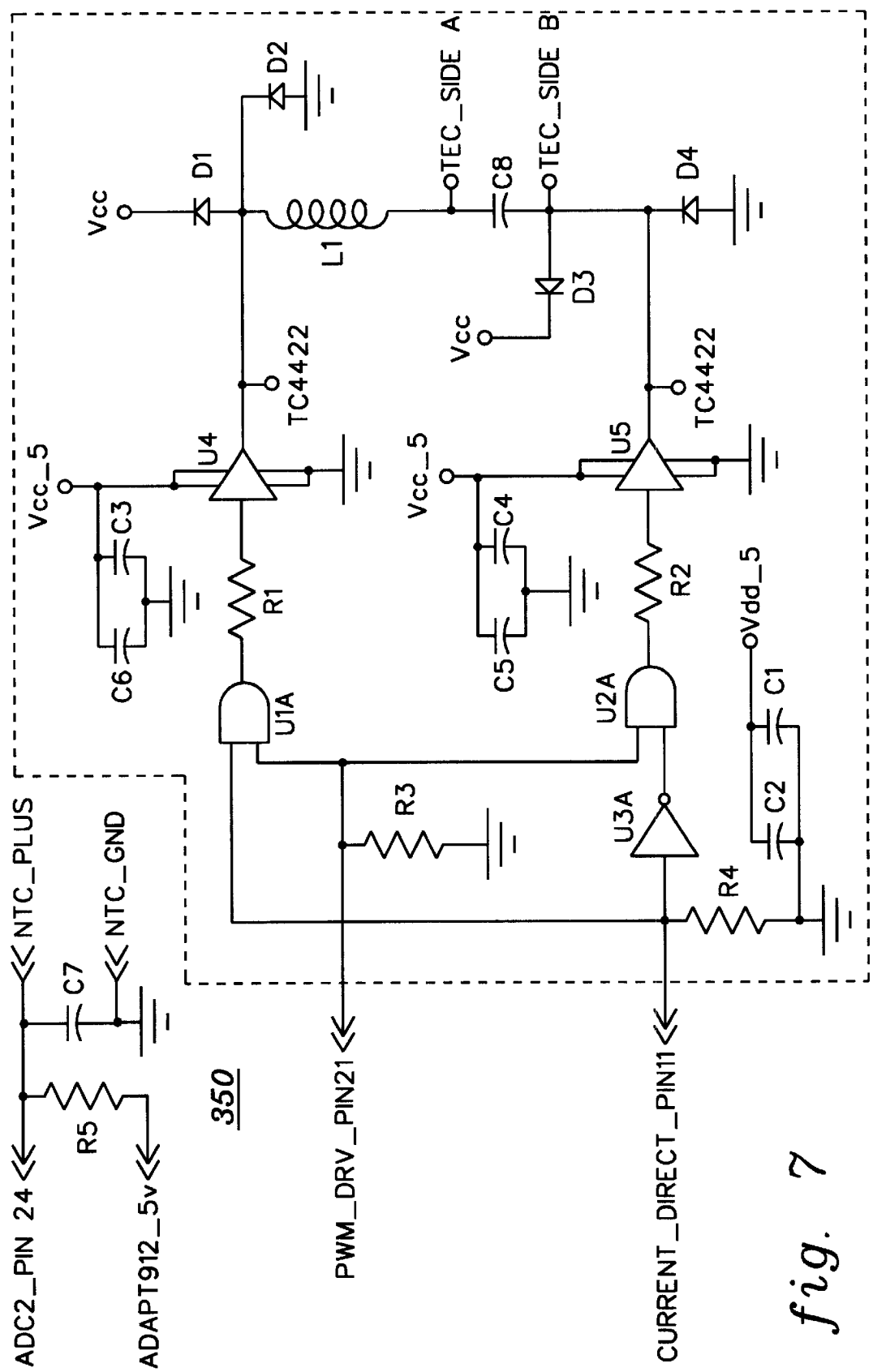
FIG. 7 is a schematic of one embodiment of the thermo-electric cooler (TEC) driver board 350 employed in the digital control circuit of FIG. 6.

A schematic of one embodiment of a TEC driver board 350 is depicted in FIG. 7 for completeness. Generally, this TEC driver board converts voltage pulses from the microcontroller into current pulses. The control signal on line 357 from the digital out circuit 320 (FIG. 6) dictates the direction of current flow from the TEC driver board. Again, the TEC can heat or cool depending upon current direction. The TEC driver board has two outputs and there are four power switches U4 & U5 arranged in an H-bridge configuration. The switches are controlled in such a way that at most two are "on" at any one time. This allows current to flow in one direction through the TEC, and if the other pair of switches is "on", then the current flows in the opposite direction. Logic is also provided to control the sequencing of how the switches are enabled or disabled. The balance of the circuit provides electrical isolation of the driver board. Usually the driver circuits switch between high and low voltage states from tens to hundreds to thousands of times per second. To eliminate rapid and large fluctuations of current through the TEC, a passive electrical filter may be used. The filter may include a series inductor (L1) and a parallel capacitor (C8). Clamping diodes (D1, D2, D3, D4) are used to allow for a smooth transition of current flow through the inductor when the drivers (U4, U5) change from an on-to-off state.

Figure 8:
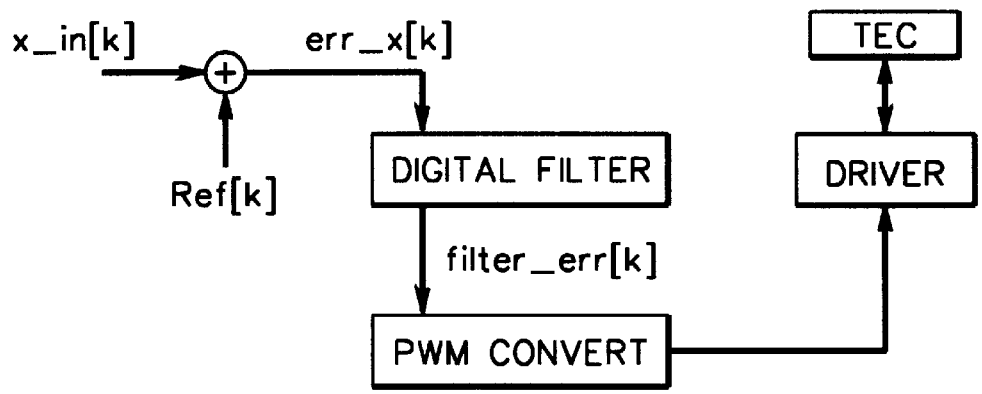
FIG. 8 is a schematic of one embodiment of a system flow diagram for the digital control circuit of FIG. 6.

FIG. 8 depicts one embodiment of the system flow through the digital control circuit of FIG. 6. The input signal (x_in[k]) is compared with a desired reference value (ref [k]) to generate an error signal (err_x[x]). This error signal then undergoes digital filtering by the microprocessor to generate a filtered feedback signal (filter_err[k]) which is used to determine a pulse width that is forwarded to the pulse width modulator. The pulse width modulator generates a sequence of square wave pulses from this pulse width, which then is forwarded to the driver board for use in driving the controllable heating/cooling system (e.g. TEC) disposed within the VOA.

Figure 9:
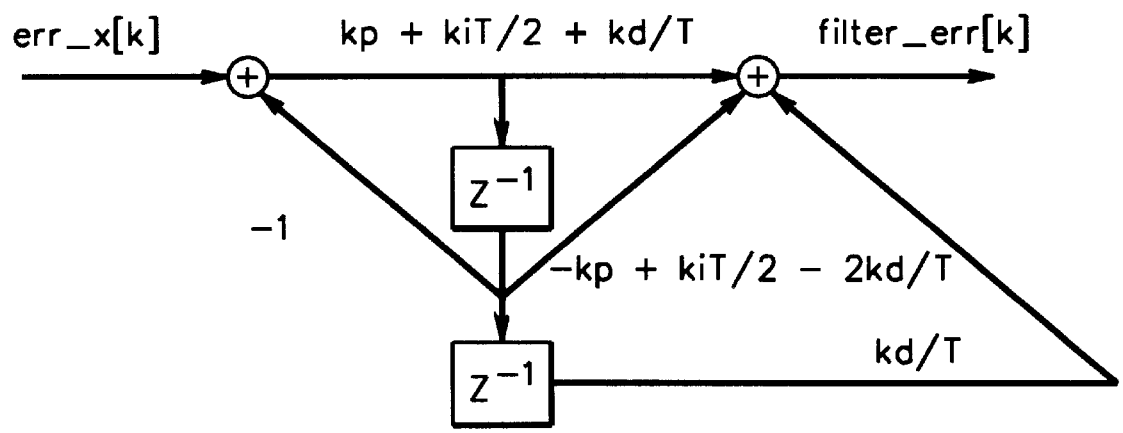
FIG. 9 is a diagram representative of one embodiment of digital filtering employed by the digital control circuit of FIG. 6; namely, a proportional integral derivative (PID) algorithm is shown (i.e., a second order, direct filter structure)

FIG. 9 depicts a schematic of a PID filtering algorithm. This algorithm is provided as one example of the digital filtering which the microprocessor could execute within the system flow diagram of FIG. 8. The algorithm generates output, using current information and certain past information to decide whether and how to adjust the output. In FIG. 9, the variables kp, ki and kd represent calculated proportional, integral and derivative parameters, while T represents the sampling period. The symbol [k] represents the particular sampled time, and Z is a sampling cycle.

Figure 10:
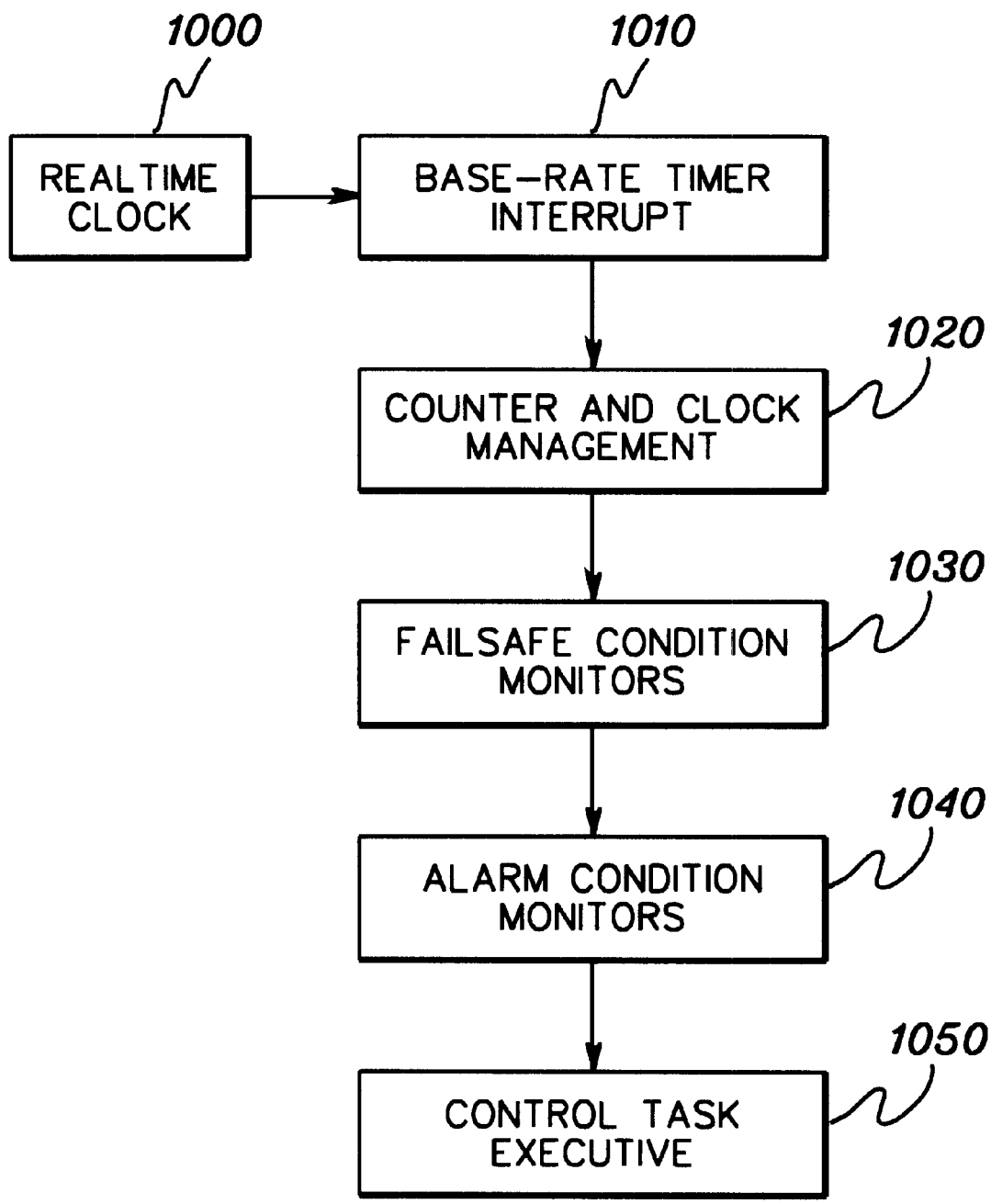
FIG. 10 is a flowchart of one embodiment of processing software implemented by the digital control circuit of FIG. 6 in accordance with one aspect of the present invention, wherein a hardware timer interrupt is employed to trigger the execution of alarm monitoring and control tasks.

FIGS. 10–13 depict various software flowcharts which are implemented within a digital feedback/control system in accordance with certain aspects of the present invention. FIG. 10 depicts a basic alarm monitoring and control task execution loop. In this figure, the real time clock 1000 is employed to generate a hardware timer interrupt 1010 which triggers execution of the alarm monitoring and control task processing. In this embodiment, clock management and counter management functions 1020 are implemented after receipt of the interrupt. Failsafe conditions are monitored 1030 to determine whether a significant failure has occurred requiring that the system be disabled. For example, if a thermistor or optical power value exceeds a failsafe limit, then the PWM driver is disabled. Assuming that a major failure has not occurred, the processor monitors the operational alarm conditions 1040. By way of example, if a monitored input signal exceeds an operational alarm limit, then an alarm flag is set and an alarm LED illuminated (see FIG. 6). An alarm condition is not sufficient to prevent the microprocessor from performing further control processing. Thus, the control task executive 1050 is thereafter executed irrespective of whether an operational alarm condition is detected.

Note that the alarm monitoring and control task processings may execute at different rates (multi-rate) provided that the rates are in integral multiples of the base rate. By way of example, the base rate might comprise one millisecond, with the failsafe being monitored at the base rate, and the control task at N×base rate, where N is [5 . . . 20], and the alarm monitor may occur at the same rate as the control task processing.

Pursuant to another aspect of the present invention, multiple control modes may be alternately executed, either by selection of the user or through an automatic transitioning between modes as described further below. In the attenuation system embodiment of FIGS. 6–9, there may be three or more basic control modes. By way of example, these modes may include an attenuation control mode (where the processor compares the returns from the two optical taps and provides feedback to obtain a desired attenuation value independent of the absolute power value), a power control mode (where the processor monitors the output optical tap of the VOA and attempts to obtain a particular absolute output power transmission level from the VOA) and/or a thermistor control mode (where the processor controls the signal back to the TEC driver board so as to drive the TEC or VOA back within a proper operating temperature range).

Figure 11:
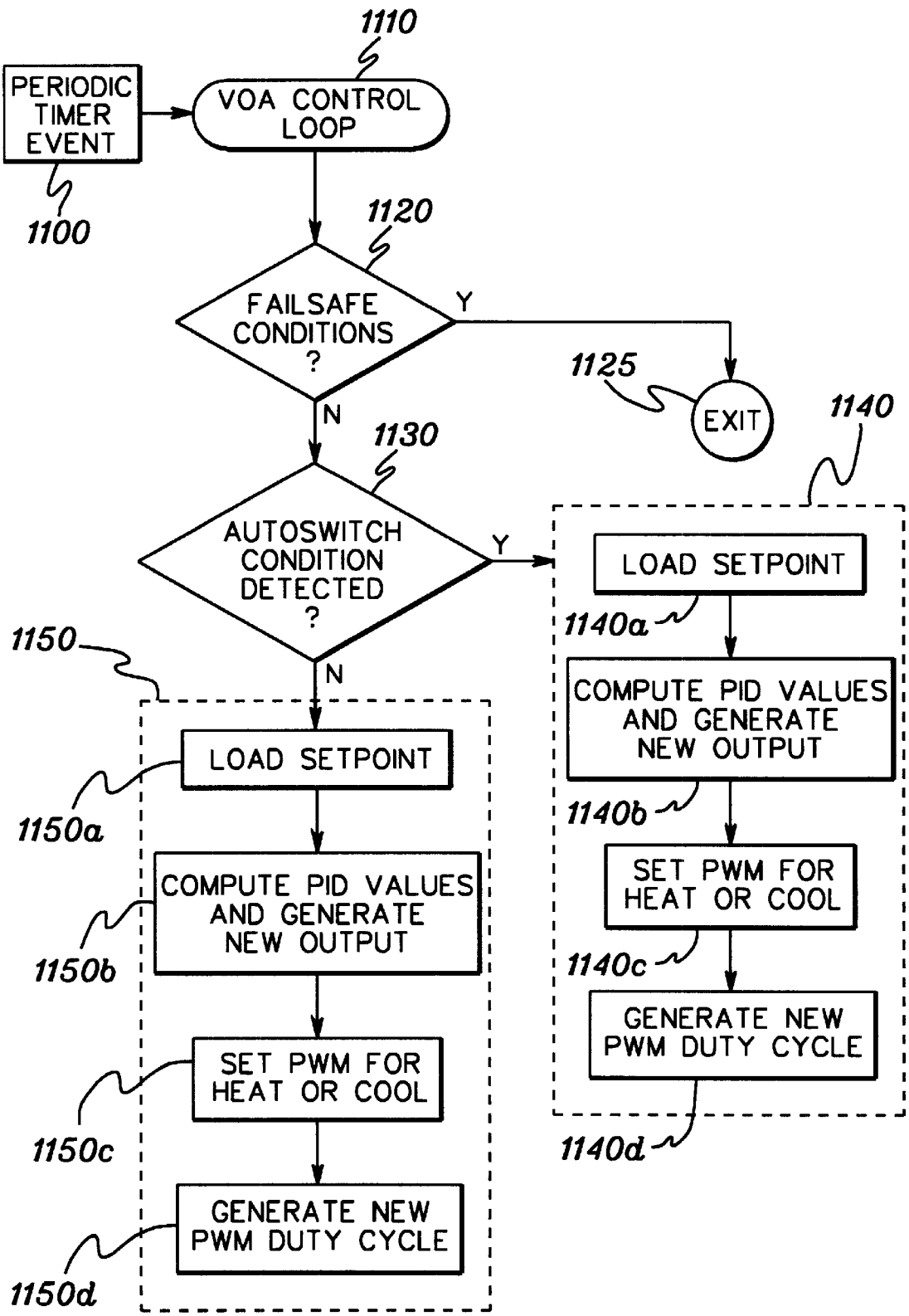
FIG. 11 is a flowchart of a further embodiment of processing software implemented by the digital control circuit in FIG. 6 in accordance with another aspect of the present invention, wherein a VOA control loop includes automatic switching between control modes responsive to whether a predefined condition is detected.

In accordance with the present invention, it is possible to dynamically switch between modes depending upon the values of the sensed signals. FIG. 11 depicts one embodiment of this auto-switching concept.

FIG. 11 depicts a VOA control loop 1110 that is entered responsive to a periodically timed event 1100. Upon entering the loop, processing determines whether any failsafe conditions have occurred 1120. If so, then no further control mode processing is taken, the PWM is disabled and the processing loop is exited 1125. Once the failsafe condition is removed, or assuming that a failsafe condition has not occurred, then processing determines whether an auto-switch condition is detected 1130. If so, then processing enters a first control mode 1140, otherwise processing defaults to a prior and second control mode 1150. In control mode 1140, setpoints are loaded 1140a, and PID values are computed and digital filter output is generated 1140b. The pulse width modulator is set for either heating or cooling 1140c, and a new PWM cycle is generated 1140d. In the second control mode 1150, similar functions 1150a, 1150b, 1150c & 1150d are performed to functions 1140a–1140d, however, the values will likely differ.

To restate, control loop 1110 is entered with each periodic timer event. If a failsafe condition exists, then the loop is existed and the failsafe condition is tested again with the next timer event. Otherwise, processing continues and determines whether an auto-switch condition is detected. If so, then processing executes a different control action then previously performed. For example, in an attenuation or power control mode, processing may automatically detect an out-of-range condition and auto-switch to a thermistor control mode until the monitored condition returns to a normal range. By way of specific example, an out-of-range condition may comprise a thermistor reading outside of a 4.0 to 16.0 Kohms range, or output power exceeding an input power level.

Figure 12:
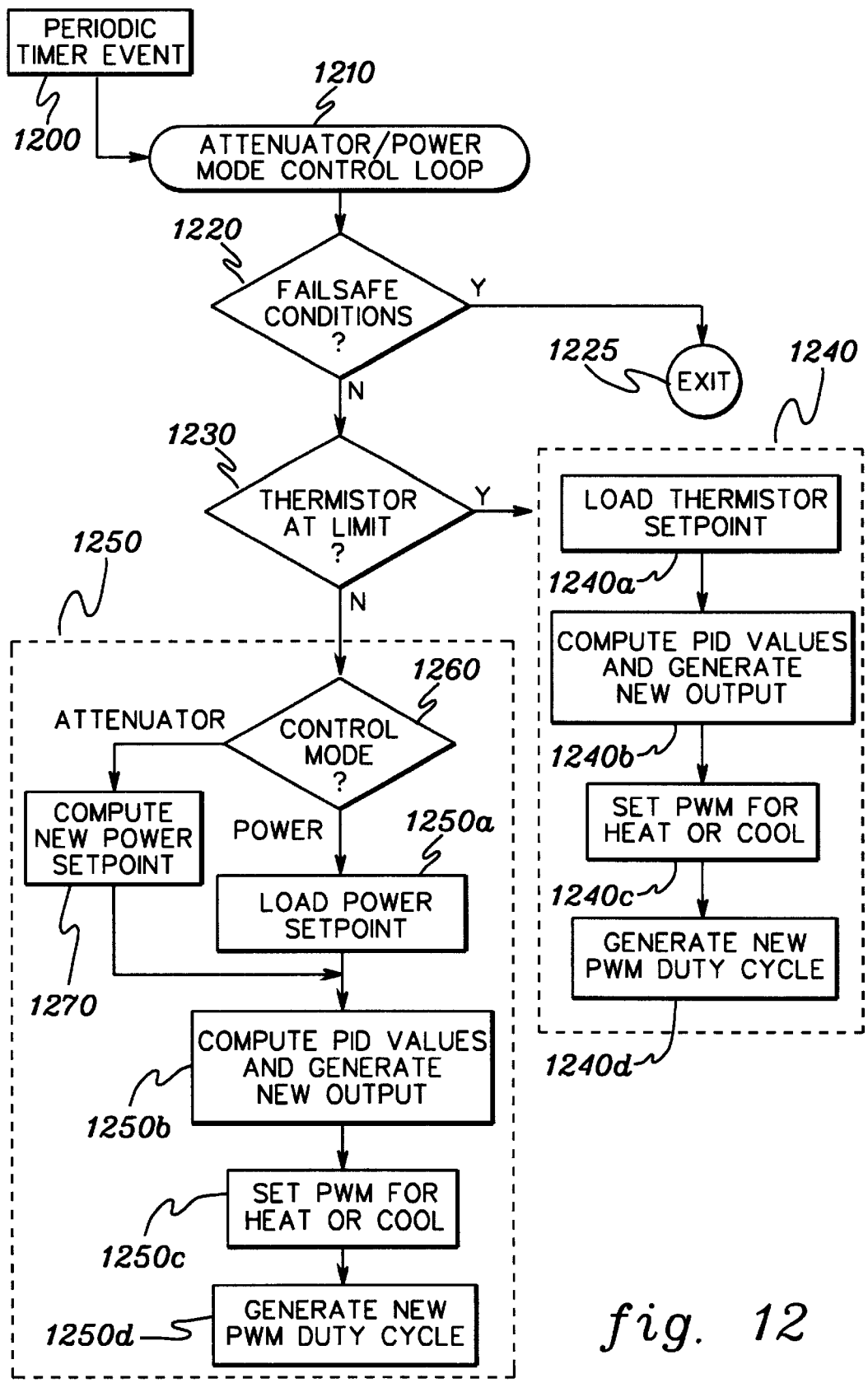
FIG. 12 is a flowchart of one embodiment of attenuation/power control mode processing implemented by the digitial control circuit of FIG. 6 in accordance with still another aspect of the present invention, wherein automatic switching occurs to a thermistor control mode if the thermistor within the VOA is at a limit.

FIG. 12 depicts one embodiment of an attenuator/power mode control loop 1210 in accordance with the principles of present invention. This processing loop is entered upon occurrence of a periodic timer event 1200. If a failsafe condition exists 1220, then the processing loop is exited 1225, the PWM is disabled and no control action is taken. Otherwise, processing determines whether the thermistor is at or exceeding an operating limit 1230. If so, then the control process automatically switches modes to a thermistor control mode 1240. In the thermistor control mode, a thermistor setpoint is loaded 1240a, and PID values are computed and a new output generated 1240b. The PWM is then set for heating or cooling 1240c as needed to drive the thermistor back within operating range. Finally, the new PWM duty cycle is generated 1240d.

Assuming that the thermistor is within an operating range, then processing determines which control mode is being executed 1260. If attenuation control mode is being performed, then a new power setpoint is computed 1270; otherwise, the power setpoint is simply loaded 1250a (i.e., a power control mode is being executed). In either mode, PID values are computed and a new output is generated 1250b. The PWM is then set for heating or cooling 1250c and a new PWM duty cycle is generated 1250d.

To summarize, if a thermistor limit alarm is set, then processing automatically transitions to the thermistor control mode at a default setpoint. After performing thermistor control processing, the control mode is exited to await the next periodic timer event. Note that in a cold start, the system can be in a low temperature alarm state and will execute the thermistor control mode until the VOA is within a defined operating temperature, however, this cold start state is also selectable.

Figure 13:
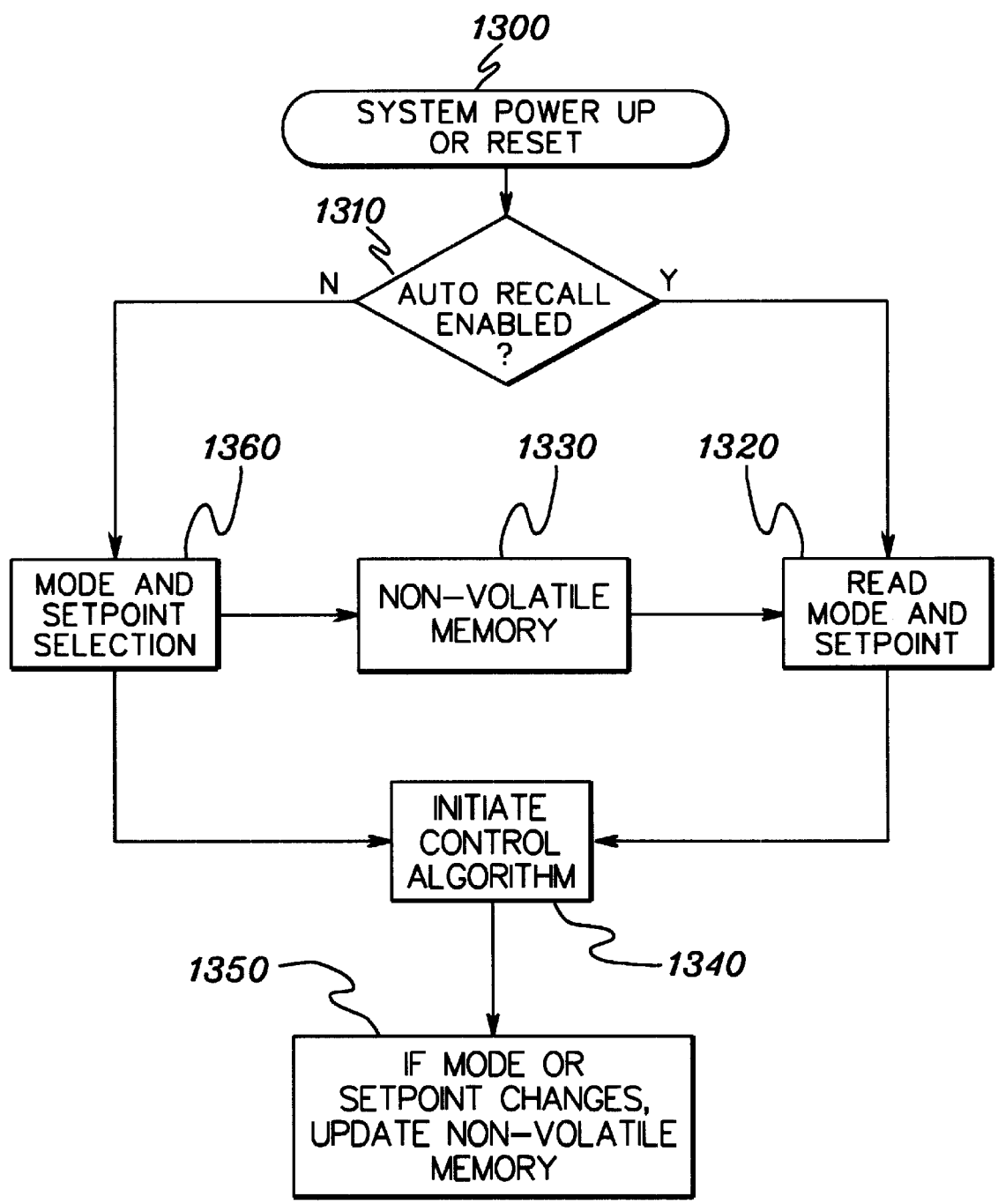
FIG. 13 is a flowchart of one embodiment of system power up/reset processing software implemented by the digital control circuit of FIG. 6 in accordance with yet another aspect of the present invention, wherein the state of the control system is saved in non-volatile memory for automatic recall with system power up or reset.

Pursuant to still another aspect of the present invention, control processing may implement a state saving feature which preserves the operational status of the control system between power cycles, and which automatically starts operation of the system using the previously saved state information. A control system in accordance with the invention has the ability to resume its control algorithm with its most recent settings, i.e., following a power off/on cycle or a system reset. FIG. 13 depicts one embodiment of this concept.

As shown, upon system power up or reset 1300, the state saving processing determines whether auto recall has been enabled 1310. In operation, the auto recall will typically always be enabled. If so, then processing automatically reads the control mode and control setpoints 1320 stored in non-volatile memory 1330 (e.g., the EEPROM of FIG. 6). After retrieving the control mode and setpoint data, processing initiates the control algorithm 1340 (such as discussed above in connection with FIGS. 10–12). In one embodiment, whenever the control mode or setpoint data changes, then the state saving processing automatically updates the non-volatile memory with this new information 1350. If the auto recall process has not been enable, then at power up or reset, the system awaits operator input of the control mode and control setpoints 1360. Once inputted, this information is then automatically stored into the non-volatile memory 1330 for future use.

Figure 14A:
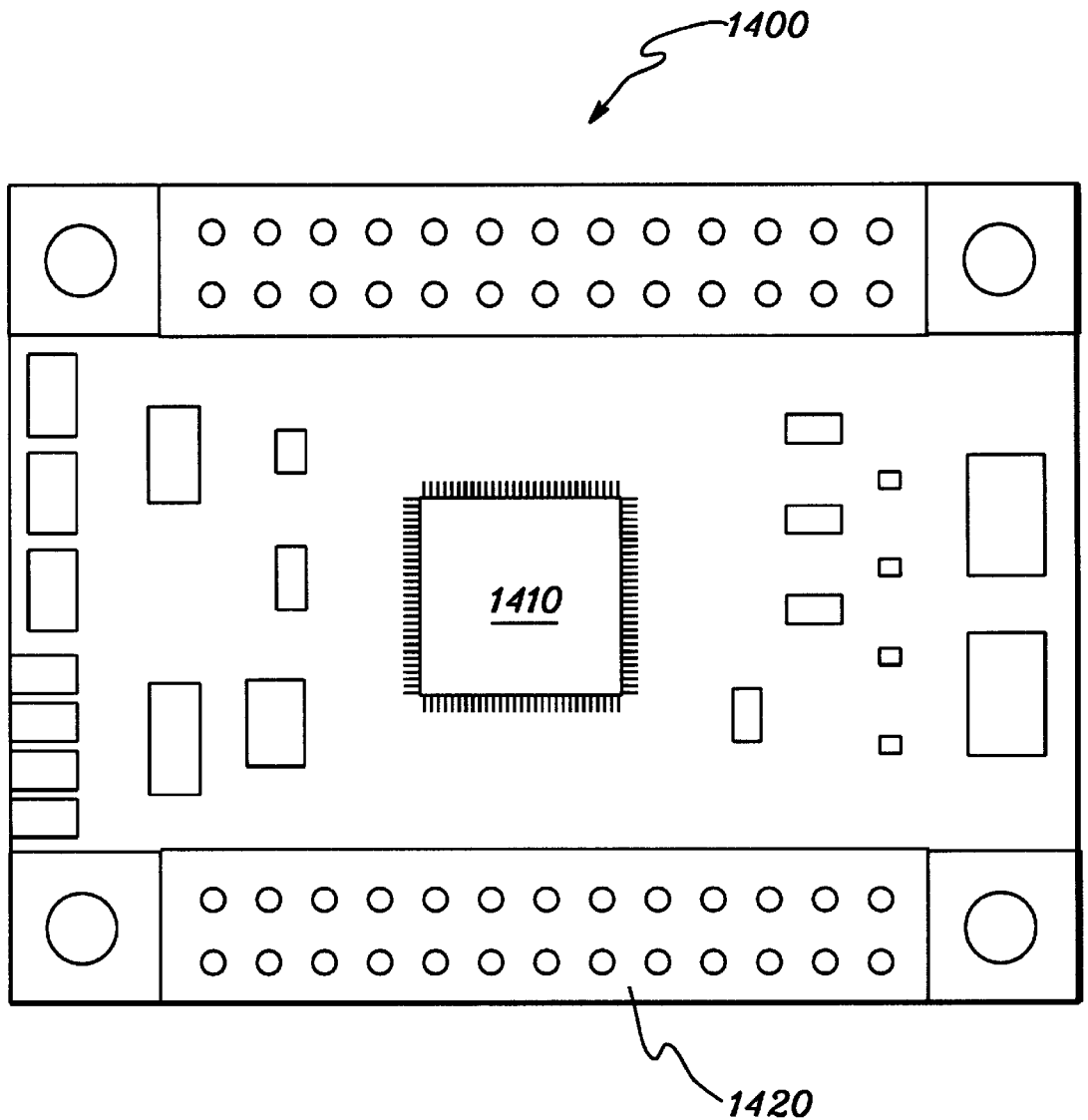
FIGS. 14A–14C depict one packaging embodiment for a digital control circuit, TEC driver board and VOA in accordance with the present invention.
Figure 14B:
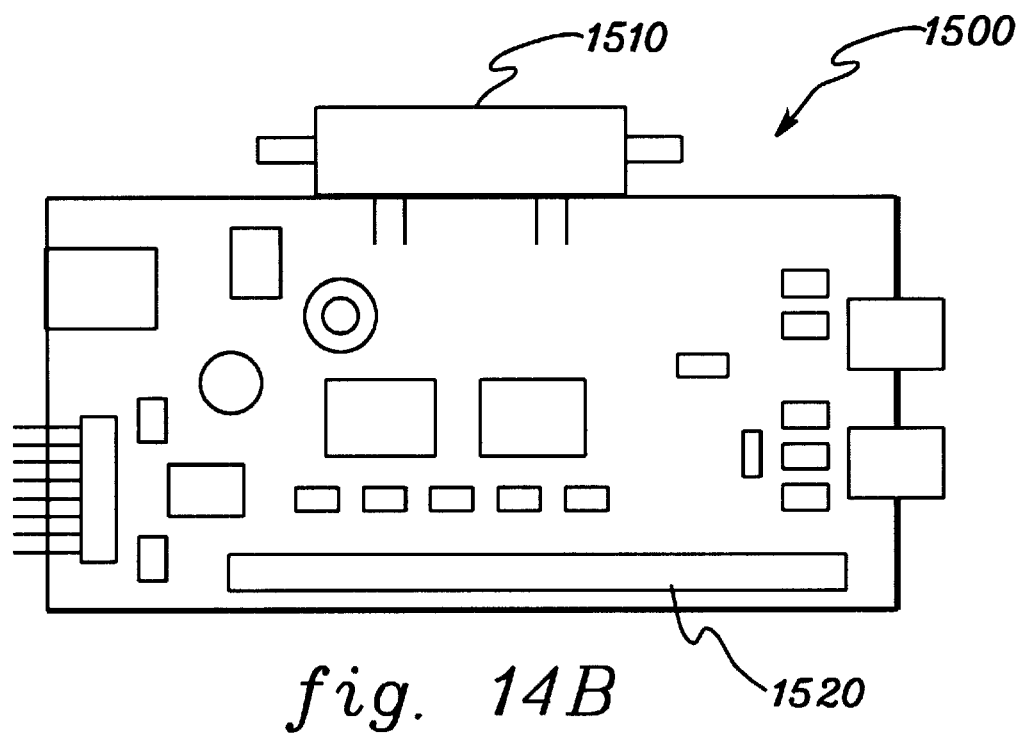
Figure 14C:
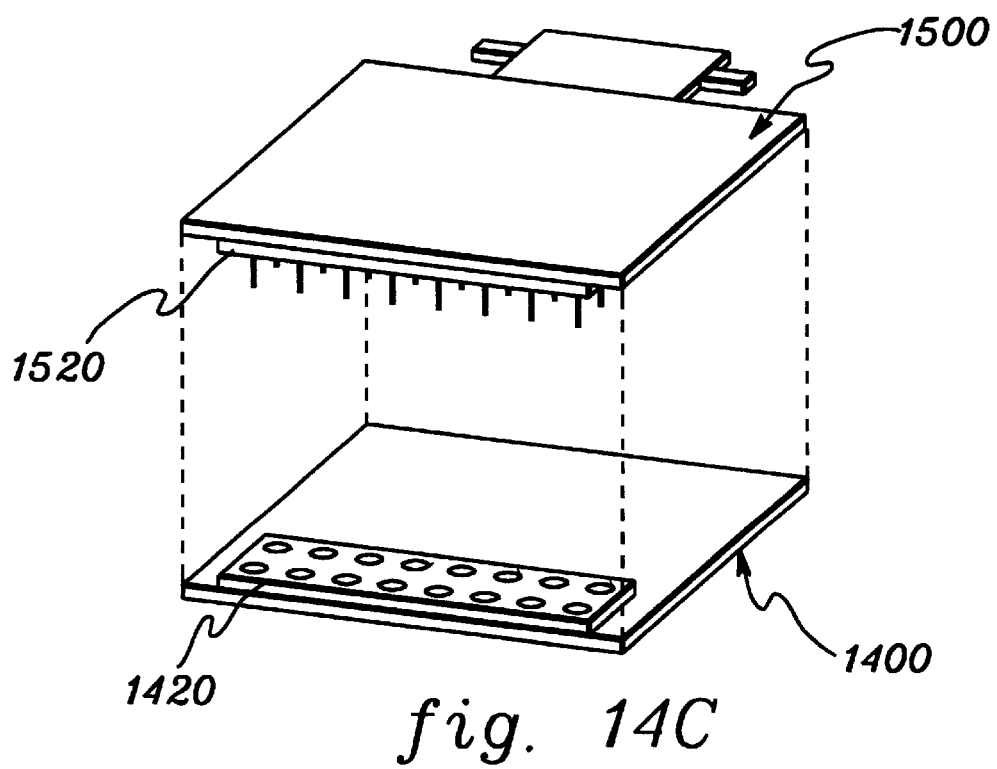

For purpose of completeness, those skilled in the art should note that the digital control concepts discussed above can be implemented in various commercial embodiments. For example, and with reference to FIGS. 14A–14C, "stackable" embodiments of a motherboard 1400 and daughterboard 1500 can accommodate the elements discussed above in FIG. 6, in a stacked package having very manageable dimensions (e.g., 3.25"×2.25"×1) and with nominal connectorization and power requirements.

Motherboard 1400 (e.g., commercially available from Technological Arts as part number ADAPT912B) may include a surface mounted version 1410 of Motorola's 68HC912B32 microcontroller along with all relevant support circuitry, and a connector 1420. Daughterboard 1500 may include a variable optical attenuator 1510, TEC driver chip(s), and optical taps, and associated circuitry, mounted on a board having connector 1510 designed to mate to connector 1410 of board 1400. Multiple such stacked module combinations can be arranged in a multiple channel attenuation system.

While the invention has been particularly shown and described with reference to preferred embodiment(s) thereof, it will be understood by those skilled in the art that various changes in form and details may be made therein without departing from the spirit and scope of the invention.

What is claimed is:

1. An attenuation system for attenuating optical energy transmitted through a fiber optic comprising:

a controllable attenuator, arranged with respect to a portion of the fiber optic, the portion of the fiber optic having a side surface through which at least some of said optical energy can be controllably extracted, and a controllable material formed over said side surface for controlling an amount of optical energy extracted from said fiber optic according to a changeable stimulus applied to the controllable material which affects the index of refraction thereof;

a control circuit coupled to the controllable attenuator for controlling a value of the changeable stimulus applied to the controllable material in accordance with a digitized feedback signal having a value related to the level of at least a portion of the optical energy transmitted within the fiber optic; and wherein said control circuit includes a digital filter for filtering an error signal produced by said control circuit, said error signal being produced by comparing said feedback signal to a desired reference level.

2. The attenuation system of claim 1, wherein the changeable stimulus comprises temperature, and wherein the controllable attenuator further comprises:

a controllable heating/cooling source in operative contact with the controllable material to change the temperature thereof, and wherein the changeable stimulus drives the controllable heating/cooling source.

3. The attenuation system of claim 2, wherein the controllable heating/cooling source comprises a thermoelectric cooler (TEC).

4. The attenuation system of claim 3, wherein the changeable stimulus comprises a modulated, pulsed signal.

5. The attenuation system of claim 1, wherein the circuit provides the modulated, pulsed signal as one or more of amplitude modulated, frequency modulated or pulse width modulated.

6. The attenuation system of claim 1, wherein the digital filter implements a proportional integral, proportional differential, or proportional integral differential filtering algorithm.

7. The attenuation system of claim 6, wherein the digital filter comprises a second order, direct filter structure.

8. The attenuation system of claim 1, wherein the feedback signal comprises an analog signal, and wherein the control circuit further comprises an analog/digital (A/D) converter for converting the analog signal to a digital signal, a processor for processing the digital signal, and a drive circuit for outputting a modulated, pulsed signal to the controllable attenuator.

9. The attenuation system of claim 8, wherein the changeable stimulus comprises the modulated, pulsed signal.

10. The attenuation system of claim 9, wherein the control circuit provides the modulated, pulsed signal as one or more of amplitude modulated, frequency modulated or pulse width modulated.

11. The attenuation system of claim 1, further comprising at least one sensor for determining said level of at least a portion of the optical energy transmitted in the fiber optic, upon which said digitized feedback signal is based.

12. The attenuation system of claim 11, wherein said at least one sensor comprises at least one optical sensor coupled to said fiber optic for sensing said level of at least a portion of the optical energy transmitted therein.

13. The attenuation system of claim 11, wherein said at least one sensor comprises a thermal sensor in said attenuator for sensing the temperature of the controllable material.

14. The attenuation system of claim 1, wherein the controllable material comprises a polar olefin polymer in admixture with a metal complex dye of nickel, palladium, or platinum, or comprises a polar olefin polymer in admixture with (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

15. The attenuation system of claim 14, wherein said polar olefin polymer comprises monomeric units derived from an acrylate.

16. The attenuation system of claim 1, wherein the controllable material comprises:
   (a) a dye component comprising a metal complex dye of nickel, palladium, or platinum; and
   (b) a copolymer component comprising at least one appended polar olefin copolymer chemically bonded to said dye component through a linking moiety attached to one chain end of each said copolymer, wherein each said appended polar olefin copolymer comprises monomeric units derived from two or more polar olefins having an ester, benzene or halogen substituent attached thereto.

17. The attenuation system of claim 16, wherein the copolymer component further comprises a detached polar olefin copolymer, wherein each said dye-appended polar olefin copolymer and said detached polar olefin copolymer independently comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

18. The attenuation system of claim 1, wherein the controllable material comprises a crosslinked siloxane polymer composition produced by crosslinking a vinyl-terminated dimethylsiloxane-diphenylsiloxane copolymer with a silane crosslinking agent in the presence of a platinum catalyst.

19. A control system for controlling optical energy transmitted through a fiber optic comprising:
   a fiber optic power control device, arranged with respect to a portion of the fiber optic;
   at least one sensor coupled to the fiber optic or the fiber optic power control device for sensing the level of at least a portion of the optical energy transmitted within the fiber optic, and for outputting a sensed level stimulus representative thereof;
   a controller circuit coupled to the at least one sensor for receiving the sensed level stimulus output therefrom, and coupled to the fiber optic power control device for providing a digitized feedback signal thereto, said digitized feedback signal having a value related to the sensed level stimulus, said controller circuit comprising:
      (i) memory for holding at least one of a control program, a control setting or a control mode to be used by the controller circuit;
      (ii) an analog-to-digital converter for receiving the sensed level stimulus and for converting the sensed level stimulus to a digital signal for processing by the controller circuit;
      (iii) a digital communication interface for facilitating monitoring of the fiber optic, the fiber optic power control device or the controller circuit, and for facilitating inputting or adjusting of control parameters employed by the controller circuit; and
      (iv) a processor for software processing of the digital signal output by the analog-to-digital converter in accordance with at least one of the control program, the control parameters or the control mode.

20. The control system of claim 19, wherein the fiber optic power control device includes a controllable material formed over a side surface of the fiber optic, said controllable material affecting optical energy within the fiber optic and being responsive to a changeable stimulus, and wherein the controller circuit controls a value of the changeable stimulus applied to the controllable material via the digitized feedback signal.

21. The control system of claim 20, wherein the fiber optic power control device comprises a controllable attenuator, and wherein the controllable material formed over said side surface of the fiber optic controls an amount of optical energy extracted from the fiber optic in accordance with the value of the changeable stimulus applied to the controllable material.

22. The control system of claim 21, wherein the controllable material comprises a polar olefin polymer in admixture with a metal complex dye of nickel, palladium, or platinum, or comprises a polar olefin polymer in admixture with (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

23. The control system of claim 22, wherein said polar olefin polymer comprises monomeric units derived from an acrylate.

24. The control system of claim 21, wherein the controllable material comprises:
   (a) a dye component comprising a metal complex dye of nickel, palladium, or platinum; and
   (b) a copolymer component comprising at least one appended polar olefin copolymer chemically bonded to said dye component through a linking moiety attached to one chain end of each said copolymer, wherein each said appended polar olefin copolymer comprises monomeric units derived from two or more polar olefins having an ester, benzene or halogen substituent attached thereto.

25. The control of claim 24, wherein the copolymer component further comprises a detached polar olefin copolymer, wherein each said dye-appended polar olefin copolymer and said detached polar olefin copolymer independently comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

26. The control system of claim 21, wherein the controllable material comprises a crosslinked siloxane polymer composition produced by crosslinking a vinyl-terminated dimethylsiloxane-diphenylsiloxane copolymer with a silane crosslinking agent in the presence of a platinum catalyst.

27. The control system of claim 21, wherein the changeable stimulus comprises temperature, and wherein the controllable attenuator further comprises:
   a controllable heating/cooling source in operative contact with the controllable material to change the temperature thereof, and wherein the changeable stimulus drives the controllable heating/cooling source.

28. The control system of claim 27, wherein the controllable heating/cooling source comprises a thermoelectric cooler (TEC).

29. The control system of claim 19, wherein the digitized feedback signal comprises a modulated, pulsed signal.

30. The control system of 29, wherein the controller circuit provides the modulated, pulsed signal as one or more of amplitude modulated, frequency modulated or pulse width modulated.

31. The control system of claim 19, wherein the processor's software processing within the controller circuit includes a digital filter for filtering an error signal produced by said controller circuit, said error signal being produced by comparing the digital signal output by the analog-to-digital converter to a desired reference level.

32. The control system of claim 31, wherein the digital filter implements a proportional integral, proportional differential, or proportional integral differential filtering algorithm.

33. The control system of claim 32, wherein the digital filter comprises a second order, direct filter structure.

34. A method of controlling optical energy transmitted through a fiber optic comprising: disposing a fiber optic power control device with respect to a side portion of the fiber optic, wherein the fiber optic power control device operates in accordance with one of multiple control modes; and controlling the fiber optic power control device, said controlling including automatically switching contol of the fiber optic power control device from a first control mode to a second control mode of said multiple control modes, said automatic switching being responsive to a detection of at least one defined condition of the fiber optic, the optical energy transmitted therethrough, or the fiber optic power control device.

35. The method of claim 34, further comprising monitoring at least one of the fiber optic, the optical energy transmitted therethrough, or the fiber optic power control device for said at least one defined condition.

36. The method of claim 34, wherein said multiple control modes include a temperature control mode, for controlling a temperature of said fiber optic power control device, and at least one of a power control mode and an attenuation control mode, for controlling optical energy transmitted through said fiber optic.

37. The method of claim 36, wherein said defined condition comprises a temperature limit of the fiber optic power control device, and wherein said automatic switching occurs when said temperature limit is reached or exceeded, said automatic switching being from said at least one power control mode or attenuation control mode to said temperature control mode.

38. The method of claim 34, wherein said controlling further comprises digitally filtering a feedback signal obtained from at least one of the fiber optic power control device or the optical energy transmitted through the fiber optic, wherein the multiple control modes include a first digital filter mode and a second digital filter mode, and wherein said automatic switching comprises automatically switching between said first and second digital filter modes upon detection of the defined condition within the fiber optic, the optical energy transmitted therethrough, or the fiber optic power control device.

39. The method of claim 38, wherein said digital filtering comprises filtering an error signal produced by comparing the feedback signal to a desired reference level, said filtering employing filter parameters, and wherein said filter parameters change between said first filter mode and said second filter mode.

40. The method of claim 38, wherein the digital filtering implements one of a proportional integral, proportional differential, or a proportional integral differential filtering algorithm.

41. The method of claim 34, wherein said fiber optic power control device comprises a controllable attenuator, arranged with respect to a portion of the fiber optic, the portion of the fiber optic having a side surface through which at least some of said optical energy can be controllably extracted, wherein a controllable material is formed over the side surface for controlling an amount of optical energy extracted from the fiber optic according to a changeable stimulus applied to the controllable material which affects the index of a fraction thereof, and wherein said controlling further comprises controlling a value of the changeable stimulus applied to the controllable material in accordance with a digitized feedback signal having a value related to the level of at least a portion of the optical energy transmitted within the fiber optic.

42. The method of claim 41, wherein the changeable stimulus comprises a modulated, pulsed signal.

43. The method of claim 42, wherein the modulated, pulsed signal comprises one or more of amplitude modulated, frequency modulated or pulse width modulated.

44. The method of claim 43, further comprising providing at least one sensor for determining the level of at least a portion of the optical energy transmitted in the fiber optic and wherein said controlling comprises providing therefrom said digitized feedback signal.

45. The method of claim 34, wherein the controllable material comprises a polar olefin polymer in admixture with a metal complex dye of nickel, palladium, or platinum, or comprises a polar olefin polymer in admixture with (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

46. The method of claim 45, wherein said polar olefin polymer comprises monomeric units derived from an acrylate.

47. The method of claim 34, wherein the controllable material comprises:
(a) a dye component comprising a metal complex dye of nickel, palladium, or platinum; and
(b) a copolymer component comprising at least one appended polar olefin copolymer chemically bonded to said dye component through a linking moiety attached to one chain end of each said copolymer, wherein each said appended polar olefin copolymer comprises monomeric units derived from two or more polar olefins having an ester, benzene or halogen substituent attached thereto.

48. The method of claim 47, wherein the copolymer component further comprises a detached polar olefin copolymer, wherein each said dye-appended polar olefin copolymer and said detached polar olefin copolymer independently comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

49. The method of claim 34, wherein the controllable material comprises a crosslinked siloxane polymer composition produced by crosslinking a vinyl-terminated dimethylsiloxane-diphenylsiloxane copolymer with a silane crosslinking agent in the presence of a platinum catalyst.

50. A system for controlling optical energy transmitted through a fiber optic comprising: a fiber optic power control device disposed with respect to a side portion of the fiber optic, wherein the fiber optic power control device operates in accordance with one of multiple control modes; and means for controlling the fiber optic power control device, said means for controlling including means for automatically switching control of the fiber optic power control device from a first control mode to a second control mode of said multiple control modes, said means for automatically switching being responsive to detection of at least one defined condition of the fiber optic, the optical energy transmitted therethrough, or the fiber optic power control device.

51. A method for powering up or resetting a digital power control system controlling optical energy transmitted through a fiber optic, said method comprising:

provixing non-volatile memory for storing mode and/or setpoint data employed by the digital power control system; and responsive to powering up or resetting of the digital power control system, automatically reading said mode and/or setpoint data from said non-volatile memory and using said mode and/or setpoint data to initiate a control algorithm within said digital power control system for controlling optical energy transmitted through the fiber optic.

52. The method of claim 51, further comprising automatically updating the non-volatile memory whenever the mode or setpoint data of the digital power control system changes.

53. The method of claim 52, further comprising initially determining at power up or resetting of the digital power control system whether auto recall of mode and/or setpoint data is enabled, and if so, performing said automatic reading, otherwise, providing a prompt for operator input of mode and/or setpoint data, and upon receipt of operator inputted mode and/or setpoint data, storing said operator inputted mode and/or setpoint data in said non-volatile memory and employing said mode and/or setpoint data to initiate said control algorithm.

54. The method of claim 51, wherein the digital power control system operates in accordance with one of multiple control modes and automatically switches between said multiple control modes, and wherein said method further comprises automatically updating said non-volatile memory whenever said digital power control system automatically switches between control modes, said updating including writing a current control mode into said non-volatile memory for subsequent reading upon system power up or resetting.

55. The method of claim 54, wherein said multiple control modes include a temperature control mode for controlling a temperature of said digital power control system, and at least one of a power control mode and an attenuation control mode, for controlling optical energy transmitted through the fiber optic, and wherein said setpoint data can vary between said multiple control modes.

56. The method of claim 51, wherein the digital power control system includes a fiber optic power control device, said fiber optic power control device including a controllable material formed over a side surface of the fiber optic, said controllable material affecting optical energy within the fiber optic and being responsive to a changeable stimulus, and wherein the method further comprises controlling a value of the changeable stimulus applied to the controllable material in accordance with said mode and/or setpoint data automatically read from non-volatile memory.

57. The method of claim 56, wherein the controllable material comprises a polar olefin polymer in admixture with a metal complex dye of nickel, palladium, or platinum, or comprises a polar olefin polymer in admixture with (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

58. The method system of claim 57, wherein said polar olefin polymer comprises monomeric units derived from an acrylate.

59. The method of claim 56, wherein the controllable material comprises:

(a) a dye component comprising a metal complex dye of nickel, palladium, or platinum; and (b) a copolymer component comprising at least one appended polar olefin copolymer chemically bonded to said dye component through a linking moiety attached to one chain end of each said copolymer, wherein each said appended polar olefin copolymer comprises monomeric units derived from two or more polar olefins having an ester, benzene or halogen substituent attached thereto.

60. The method of claim 59, wherein the copolymer component further comprises a detached polar olefin copolymer, wherein each said dye-appended polar olefin copolymer and said detached polar olefin copolymer independently comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

61. The method of claim 56, wherein the controllable material comprises a crosslinked siloxane polymer composition produced by crosslinking a vinyl-terminated dimethylsiloxane-diphenylsiloxane copolymer with a silane crosslinking agent in the presence of a platinum catalyst.

62. A system for powering up or resetting a digital power control system controlling optical energy transmitted through a fiber optic, said system comprising:

non-volatile memory for storing mode and/or setpoint data employed by the digital power control system; and means for automatically reading mode and/or setpoint data from the non-volatile memory responsive to powering up or resetting of the digital power control system, and for using said mode and/or setpoint data to initiate a control algorithm within said digital power control system for controlling optical energy transmitted through the fiber optic.

* * * * *